US011539646B2

(12) United States Patent
Rieseberg et al.

(10) Patent No.: US 11,539,646 B2
(45) Date of Patent: Dec. 27, 2022

(54) DIFFERENTIATED MESSAGE PRESENTATION IN A COMMUNICATION PLATFORM

(71) Applicant: Slack Technologies, Inc., San Francisco, CA (US)

(72) Inventors: Felix Rieseberg, San Francisco, CA (US); Tyler Lewis, San Anselmo, CA (US); Jan Hannemann, Victoria (CA)

(73) Assignee: Slack Technologies, LLC, San Francisco, CA (US)

( * ) Notice: Subject to any disclaimer, the term of this patent is extended or adjusted under 35 U.S.C. 154(b) by 0 days.

(21) Appl. No.: 17/231,430

(22) Filed: Apr. 15, 2021

(65) Prior Publication Data
US 2022/0337541 A1   Oct. 20, 2022

(51) Int. Cl.
*H04L 51/214* (2022.01)
*H04L 51/18* (2022.01)
*H04W 4/12* (2009.01)
*H04L 67/50* (2022.01)

(52) U.S. Cl.
CPC ............ *H04L 51/214* (2022.05); *H04L 51/18* (2013.01); *H04L 67/535* (2022.05); *H04W 4/12* (2013.01)

(58) Field of Classification Search
CPC ......... H04L 51/14; H04L 51/18; H04L 67/22; H04W 4/12
USPC .......................................................... 709/206
See application file for complete search history.

(56) References Cited

U.S. PATENT DOCUMENTS

| 8,214,446 | B1* | 7/2012 | Siegel | H04L 51/00 709/207 |
| 10,511,653 | B2* | 12/2019 | Kisin | G06F 40/197 |
| 10,600,222 | B2* | 3/2020 | Nair | H04M 1/7243 |
| 10,834,127 | B1* | 11/2020 | Yeh | H04L 51/212 |
| 2010/0049807 | A1* | 2/2010 | Thompson | G06Q 10/107 709/206 |
| 2011/0092221 | A1* | 4/2011 | Zubas | H04W 4/021 455/466 |

(Continued)

OTHER PUBLICATIONS

David Auerbach, "Re-Animator. How Stewart Butterfield created Flickr and Slack out of the ashes of failed projects" online retrieved May 9, 2019. Retrieved from the Internet: <URL: https://slate.com/business/2014/05/stewart-butterfield-flickr-and-slack-how-he-snatched-victory-from-the-jaws-of-defeat.html> 12 pages. (dated May 28, 2014, 2:48 PM) 8 pages.

(Continued)

*Primary Examiner* — James E Springer
(74) *Attorney, Agent, or Firm* — Lee & Hayes, P.C.

(57) ABSTRACT

Differentiated message presentation in a communication platform is described. In an example, a message to be posted to the communication platform can be received, wherein the communication platform is associated with a plurality of users that are permissioned to access content associated with the communication platform. In an example, a first user profile of a first user of the plurality of users can be associated with a first characteristic of the first user and a second user profile of a second user of the plurality of users can be associated with a second characteristic. Techniques described herein enable differentiated presentation of the message, in respective user interfaces of the communication platform, based at least in part on the first characteristic and the second characteristic.

20 Claims, 17 Drawing Sheets

(56) References Cited

U.S. PATENT DOCUMENTS

| | | | | |
|---|---|---|---|---|
| 2012/0028659 | A1* | 2/2012 | Whitney | H04M 1/7243 455/466 |
| 2012/0131109 | A1* | 5/2012 | Bostick | H04L 51/14 709/206 |
| 2012/0246719 | A1* | 9/2012 | Bhamidipaty | H04L 63/1408 726/22 |
| 2016/0277349 | A1* | 9/2016 | Bhatt | G06F 40/40 |
| 2018/0004839 | A1* | 1/2018 | Dhanyamraju | G06F 16/337 |
| 2018/0287982 | A1 | 10/2018 | Draeger et al. | |
| 2020/0244606 | A1* | 7/2020 | Rodriguez | H04L 51/16 |
| 2021/0240836 | A1* | 8/2021 | Hazony | G06F 21/554 |

OTHER PUBLICATIONS

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 4 pages.

"Die, Email, Die! A Flickr Cofounder Aims to Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 3 pages.

Robert Hof, "Stewart Butterfield on How Slack Became a $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 4 pages.

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 16 pages.

Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 3 pages.

Internet Relay Chat, Wikipedia, [online][retrieved May 30, 2019]. Retrieved from the Internet: <URL: https://en.wikipedia.org/wiki/Internet_Relay_Chat>. (dated May 28, 2019) 21 pages.

Mike Issac, "Slack, a Start-Up With an App to Foster Business Collaboration, Is Valued at $1.1 Billion", The New York Times Blogs (BITS), Lexisnexis, https://advance.lexis.com/api/permalink/3eb84b34-a8f9-4d7d-9573-89d9598a4963/?context=1000516>. (dated Oct. 31, 2014) 3 pages.

Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 6 pages.

Matsumoto, T. et al., "Chocoa Communicator—A New Communication System Based on Awareness and Text Communications", Fujitsu Sci. Tech. J., 36, 2, (Dec. 2000) pp. 154-161.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.

Ernie Smith, "Picking Up the Slack", Tedium, [online][retrieved May 9, 2019]. Retrieved from the Internet: <URL: https://tedium.co/2017/10/17/irc-vs-slack-chat-history/>. (dated Oct. 17, 2017) 8 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 21 pages.

Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014, 5:45 PM) 4 pages.

Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 3 pages.

U.S. Appl. No. 16/993,859, filed Aug. 14, 2020, Butterfield, et al., "Electronic Board Associated With a Communication Platform", 45 pages.

* cited by examiner

800

```
┌─────────────────────────────────────────────────────────────┐
│  RECEIVE A MESSAGE TO BE POSTED TO A VIRTUAL SPACE OF A     │
│  COMMUNICATION PLATFORM, WHEREIN THE VIRTUAL SPACE IS       │
│  ASSOCIATED WITH A PLURALITY OF USERS                       │
│                           802                                │
└─────────────────────────────────────────────────────────────┘
                              │
                              ▼
┌─────────────────────────────────────────────────────────────┐
│  DETERMINE, FROM A FIRST USER PROFILE OF A FIRST USER OF    │
│  THE PLURALITY OF USERS, A FIRST CHARACTERISTIC OF THE      │
│  FIRST USER                                                  │
│                           804                                │
└─────────────────────────────────────────────────────────────┘
                              │
                              ▼
┌─────────────────────────────────────────────────────────────┐
│  DETERMINE, FROM A SECOND USER PROFILE OF A SECOND USER     │
│  OF THE PLURALITY OF USERS, A SECOND CHARACTERISTIC OF      │
│  THE SECOND USER                                             │
│                           806                                │
└─────────────────────────────────────────────────────────────┘
                              │
                              ▼
┌─────────────────────────────────────────────────────────────┐
│  DIFFERENTIATE PRESENTATION OF THE MESSAGE IN RESPECTIVE    │
│  INSTANCES OF A USER INTERFACE OF THE COMMUNICATION         │
│  PLATFORM BASED AT LEAST IN PART ON THE FIRST               │
│  CHARACTERISTIC AND THE SECOND CHARACTERISTIC               │
│                           808                                │
└─────────────────────────────────────────────────────────────┘
```

FIG. 8

DIFFERENTIATED MESSAGE PRESENTATION IN A COMMUNICATION PLATFORM

TECHNICAL FIELD

A communication platform can leverage a network-based computing system to enable users to exchange data. In an example, users of the communication platform can communicate with other users via channels, direct messages, and/or other virtual spaces. A channel, direct message, and/or other virtual space can be a data route used for exchanging data between and among systems and devices associated with the communication platform. For example, a channel may be established between and among various user computing devices (e.g., clients), allowing the user computing devices to communicate and share data between and among each other over one or more networks. That is, in some examples, the communication platform can be a channel-based platform and/or hub for facilitating communication between and among users. In some examples, data associated with a channel, a direct message, and/or other virtual space can be presented via a user interface. In some examples, the user interface can present a data feed indicating messages posted to and/or actions taken with respect to a particular channel, direct message, and/or other virtual space.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different figures indicates similar or identical components or features. The figures are not drawn to scale.

FIG. 8 illustrates an example process for differentiating presentation of a message based at least in part on characteristic(s) of users of a communication platform, as described herein.

DETAILED DESCRIPTION

Figure 1:
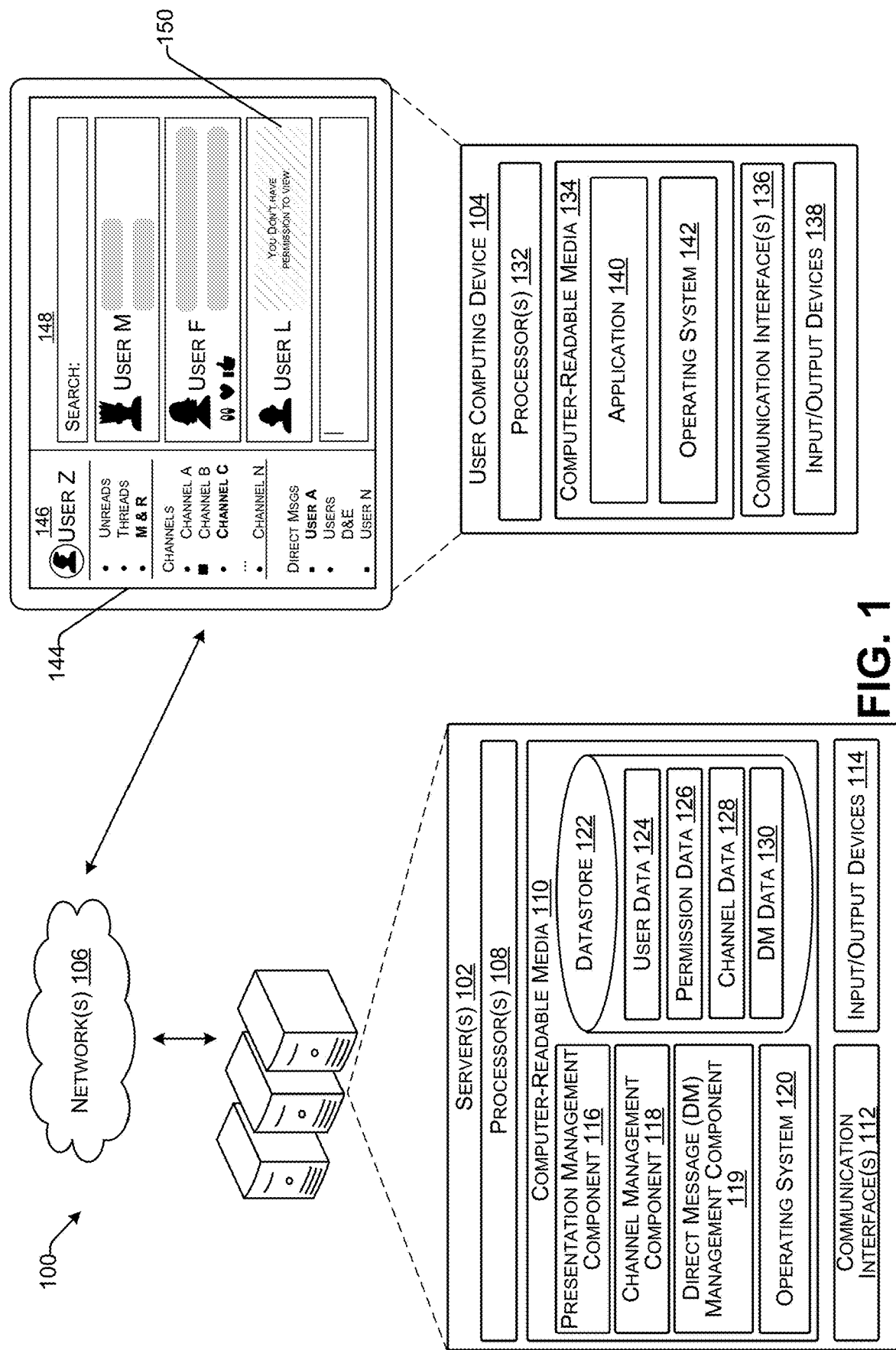
FIG. 1 illustrates an example environment for performing techniques described herein.

Messages exchanged via a communication platform can be presented in accordance with different presentation characteristics based, at least in part, on characteristics of users and/or other context. A communication platform, which, in some examples can be a group-based communication platform, a channel-based communication platform, a permission-based communication platform, a channel-based messaging platform, and/or any other platform for facilitating communication between and among users, can enable users to exchange messages via the communication platform. In some examples, the communication platform can determine characteristics of users associated with the communication platform and/or other context to determine presentation characteristics for presenting messages and/or other objects. That is, in at least one example, a message or other object can be presented differently to different users based at least in part on characteristics associated therewith. In some examples, differentiated presentation can be based on different roles (e.g., a message can be presented differently to a manager versus a general user), user types (e.g., a message can be presented differently to an administrator versus a general user), conditions (e.g., a message can be presented differently to a user who has satisfied a condition versus one who has not), team or group membership (e.g., a message can be presented differently to members of a first team versus members of a second team), and/or the like. That is, techniques described herein relate to the presentation of a single message or other object with different views based on characteristics of users and/or other context. In at least one example, such differentiated presentation of messages and/or other objects can provide privacy and/or security in virtual spaces of the communication platform, for example, when such virtual spaces are shared by multiple groups of users, as described herein.

For purposes of this discussion, a "message" can refer to any electronically generated digital object, provided by a user using a client associated with the communication platform, that is configured for display within a channel, direct message, and/or other virtual space of the communication platform for facilitating communications as described herein. A message may include any text, image, video, audio, or combination thereof provided by a user (using a client). For instance, the user may provide a message that includes text, as well as an image and/or a video, within the message as message contents and/or otherwise associated with the message (e.g., as an attachment or link). In such an example, the text and image and/or video can comprise the message. In some examples, messages can be associated with one or more files or other attachments, emojis, reactjis, and/or the like. In some examples, messages can include or be associated with one or more links to content stored by the communication platform or a third-party platform or service. Each message can include metadata comprising a sending user identifier (e.g., identifying a sender or originator of the message), a recipient user identifier (e.g., identifying a user and/or entity that is intended to receive the message), a message identifier (e.g., identifying the message itself), a group identifier (e.g., identifying a group associated with the sender and/or message), a channel identifier (e.g., identifying a channel associated with the message and/or the recipient), a direct message identifier (e.g., identifying a direct message associated with the message and/or the recipient), a virtual space identifier (e.g., identifying a virtual space associated with the message and/or the recipient), and/or the like. In at least one example, each of the foregoing identifiers may comprise American Standard Code for Information Interchange (ASCII) text, a pointer, a memory address, or the like. In some examples, message metadata can include message content in addition to the one or more identifiers listed above.

While techniques described herein are described with reference to "messages," techniques described herein can be similarly applicable to any object associated with the communication platform. Examples of such objects can comprise channels, direct messages, boards, files, user profiles, work flows, and/or the like. That is, the communication platform can utilize user characteristics to cause channels, direct messages, boards, files, user profiles, work flows, and/or the like of the communication platform to be presented in accordance with different presentation characteristics. Additional details are described below.

The communication platform can store user data in user profiles (or "user accounts"), which can be associated with users of the communication platform. A user profile can store, among other data, data indicating group(s) with which the user is associated, role(s) of the user (e.g., based on an organizational chart), user type(s) of the user (e.g., an administrator user, a verified user, a non-administrator user, a non-verified user, etc.), characteristic(s) of the user (e.g., primary language, abilities (e.g., with respect to vision, hearing, etc.), etc.), preference(s) of the user, qualification(s) of the user, conditions that have been satisfied (or not) by the user, permissions data, and/or the like. In some examples, an organizational chart, as used herein, can be a data structure that represents the structure of an organization and relationships and/or relative ranks of its parts and/or positions (i.e., roles). In some examples, organizational charts can be provided by organizations associated with the communication platform. In some examples, the communication platform can analyze messaging and/or other interaction data to determine relationships between users and/or relative ranks, and can therefore infer organizational charts. In some examples, workspaces, teams, or other groups can be associated with similar data structures representing structure, relationships, and/or relative ranks of roles within the workspaces, teams, or other groups. In some examples, user type can indicate whether a user is an administrator, a verified user, and/or the like. In at least one example, user type can be a designation provided by the communication platform (e.g., wherein roles can be designated by organizations, workspaces, teams, and/or other groups).

In at least one example, prior to causing a message to be displayed via a client of a user, the communication platform can access data associated with a user profile, which can be used to determine a characteristic of the user. In some examples, the communication platform can determine user characteristics via additional or alternative data (e.g., based on organizational charts alone and/or without accessing user profiles). In at least one example, based at least in part on determining a characteristic of a user, the communication platform can then determine a presentation characteristic for the message based at least in part on the characteristic of the user. As such, when the message is displayed, it can be displayed in accordance with the presentation characteristic, which can be particular to a user (or other users with the same or similar characteristics of the user). That is, techniques described herein cause display of a message in accordance with first presentation characteristic(s) for users having the same or similar characteristics and second presentation characteristic(s) for users having different characteristics.

As an example, a user can be associated with a first role. In such an example, the communication platform can display a message in accordance with a first presentation characteristic for the user, which can be determined based at least in part on the user being associated with the first role. The user can be promoted or assigned a second role, which, in some examples, can be a management role. In such an example, the communication platform can display the message in accordance with a second presentation characteristic for the user, which can be determined based at least in part on the user being associated with the second role. In some examples, the second presentation characteristic can be less restrictive such that the user is permitted to view more message contents than when presented in association with the first presentation characteristic.

As another example, a message may only be viewed by users that have satisfied a condition. Such a condition can correspond to a signed document (e.g., a non-disclosure agreement, etc.), a completed training (e.g., HIPPA training, OSHA training, etc.), a completed certification, compliance, etc. A user can be associated with an indication that the condition has not been satisfied. In some examples, the user may not be permitted to view contents of a particular message until the condition has been satisfied. As such, in contrast to a user who has satisfied the condition, the message may be displayed in accordance with a presentation characteristic that obfuscates at least a portion of the message and/or prompts the user to satisfy the condition. In at least one example, in response to a determination that the user has satisfied the condition, the presentation of the message can be updated such that the user can view the entirety of the message.

In some examples, user characteristics can be used to determine how a user interface is configured, for example, with respect to which controls and/or permissions are presented via the user interface. In some examples, user interface elements of the user interface can appear differently for users having different characteristics. Further, in some examples, user characteristics can be used to determine which virtual spaces a user is permitted to access, and thus, which virtual spaces are presented via the user interface. As an example, users associated with a particular role can have access to a set of channels or boards. In such an example, the user interface (as presented for any client of a user associated with the particular role) can be presented with the set of channels or boards. As another example, when a user is moved to a new role, the user may be granted access to a new set of channels or boards, as described herein. In such an example, the user interface can be presented with the new set of channels or boards. As an alternative example, when a user is moved to a new role, the user may be removed from one or more channels or otherwise be restricted from accessing the one or more channels. In such an example, the user interface can be presented with a modified set of channels that exclude the one or more channels from which the user has been removed and/or otherwise restricted. That is, while techniques described above relate to differentiated presentation of messages for users associated with different characteristics, techniques can be similarly applicable to differentiated access to other objects of the communication and thus, presentation of a user interface associated with the communication platform.

In some examples, techniques described herein can relate to provisioning viewing privileges to a user (e.g., user profile) to enable the user to view a message and/or message thread without associating the user with a virtual space to which the message and/or message thread was posted. For example, a user can be associated with a message inconspicuously (e.g., similar to a blind carbon copy in email) such that other users are not aware of the association of the user with the message. In some examples, the user may not be associated with the virtual space to which the message is posted. In at least one example, association of the user with the message can enable the user to view the message and any subsequent messages associated with the message (e.g., message identifier). Such subsequent messages can be threaded messages. The user, however, may not be permitted to view other messages associated with the virtual space. Additional details are described below.

As described above, techniques described herein provide privacy and/or security in virtual spaces of the communication platform, for example, when such virtual spaces are shared by multiple groups of users. In some examples, techniques described herein can reinforce permissions at a more granular level than what is available with existing techniques. For instance, in existing techniques, members of a channel, direct message, board, or other virtual space of a communication platform can have equal permissions and/or access to content associated with the channel, direct message, board, or other virtual space. Techniques described herein, however, relate to differentiated presentation of content associated with such virtual spaces. That is, while a message or other content can be associated with a virtual space, the message or other content can be presented differently to different members of the virtual space based at least in part on individual characteristics.

Further, in existing techniques, users can be added to virtual spaces by other users. However, users are often left to remove themselves from channels or other virtual spaces that are no longer relevant for the users. As a result, channels, direct messages, boards, and/or other virtual spaces can be associated with users that are not actively using the virtual spaces. Further, users may be associated with virtual spaces that are no longer relevant. As such, inactive and/or irrelevant associations between users and virtual spaces can be a waste of computing resources for the virtual spaces, users, and the communication platform. Techniques described herein enable the addition, removal, or other modification of associations between users and virtual spaces via minimal or reduced interaction. For instance, by granting permissions to objects such as channels, direct messages, boards, and/or the like based on roles, user type, authentication, verification, conditions, user preference and/or other user characteristics, techniques described herein can facilitate the addition, removal, or other modification of inactive and/or irrelevant associations between users and virtual spaces. This can de-clutter user interfaces for users and can reduce the amount of data exchanged over the network(s) described herein as the communication platform can refrain from sending updates to clients of users associated with inactive and/or irrelevant virtual spaces. That is, techniques described herein can improve existing technological processes associated with communicating via communication platforms.

Additional or alternative improvements to those described above are described below with reference to the figures. Furthermore, to the extent techniques described herein relate to differentiating presentation of messages exchanged via the communication platform, techniques described herein can be similarly applicable to other types of objects of the communication platform, as described above. Moreover, in some examples, techniques described herein can be similarly applicable to other types of communications such as emails, text messages, social media posts, documents, and/or the like.

FIG. 1 illustrates an example environment 100 for performing techniques described herein. In at least one example, the example environment 100 can include one or more server computing devices (or "server(s)") 102. In at least one example, the server(s) 102 can include one or more servers or other types of computing devices that can be embodied in any number of ways. For example, in the case of a server, the functional components and data can be implemented on a single server, a cluster of servers, a server farm or data center, a cloud-hosted computing service, a cloud-hosted storage service, and so forth, although other computer architectures can additionally or alternatively be used.

In at least one example, the server(s) 102 can be associated with a communication platform that can leverage a network-based computing system to enable users of the communication platform to exchange data. In at least one example, the communication platform can be "group-based" such that the platform, and associated systems, channels, messages, and/or virtual spaces, have security (that can be defined by permissions) to limit access to defined groups of users, such a defined group of users having, for instance, sole access to a given communication channel. In some examples, such groups of users can be defined by identifiers, which can be associated with common access credentials, domains, or the like. In some examples, the communication platform can be a hub, offering a secure and private virtual space to enable users to chat, meet, call, collaborate, transfer files or other data, message, or otherwise communicate between or among each other, within secure and private virtual spaces, such as channel(s), direct message(s), board(s), and/or the like.

In some examples, each group can be associated with an organization, which can be associated with an organization identifier. Users associated with the organization identifier can chat, meet, call, collaborate, transfer files or other data, message, or otherwise communicate between or among each other in a secure and private virtual space available via the communication platform. In some examples, each group can be associated with a workspace, associated with a workspace identifier. Users associated with the workspace identifier can chat, meet, call, collaborate, transfer files or other data, message, or otherwise communicate between or among each other in a secure and private virtual space available via the communication platform. In some examples, a group can be associated with multiple organizations and/or workspaces. In some examples, an organization can be associated with multiple workspaces.

In at least one example, the server(s) 102 can communicate with a user computing device 104 via one or more network(s) 106. That is, the server(s) 102 and the user computing device 104 can transmit, receive, and/or store data (e.g., content, messages, data, or the like) using the network(s) 106, as described herein. In some examples, the user computing device 104 can comprise a "client" associated with a user. The user computing device 104 can be any suitable type of computing device, e.g., portable, semi-portable, semi-stationary, or stationary. Some examples of the user computing device 104 can include a tablet computing device, a smart phone, a mobile communication device, a laptop, a netbook, a desktop computing device, a terminal computing device, a wearable computing device, an augmented reality device, an Internet of Things (IOT) device, or any other computing device capable of sending communications and performing the functions according to the techniques described herein. While a single user computing device 104 is shown, in practice, the example environment 100 can include multiple (e.g., tens of, hundreds of, thousands of, millions of) user computing devices. In at least one example, user computing devices, such as the user computing device 104, can be operable by users to, among other things, access communication services via the communication platform. A user can be an individual, a group of individuals, an employer, an enterprise, an organization, or the like. In some examples, users can be associated with designated roles (e.g., based at least in part on an org chart) and/or types (e.g., administrator, verified, etc.).

The network(s) 106 can include, but are not limited to, any type of network known in the art, such as a local area network or a wide area network, the Internet, a wireless network, a cellular network, a local wireless network, Wi-Fi and/or close-range wireless communications, Bluetooth®, Bluetooth Low Energy (BLE), Near Field Communication (NFC), a wired network, or any other such network, or any combination thereof. Components used for such communications can depend at least in part upon the type of network, the environment selected, or both. Protocols for communicating over such network(s) 106 are well known and are not discussed herein in detail.

In at least one example, the server(s) 102 can include one or more processors 108, computer-readable media 110, one or more communication interfaces 112, and input/output devices 114.

In at least one example, each processor of the processor(s) 108 can be a single processing unit or multiple processing units, and can include single or multiple computing units or multiple processing cores. The processor(s) 108 can be implemented as one or more microprocessors, microcomputers, microcontrollers, digital signal processors, central processing units (CPUs), graphics processing units (GPUs), state machines, logic circuitries, and/or any devices that manipulate signals based on operational instructions. For example, the processor(s) 108 can be one or more hardware processors and/or logic circuits of any suitable type specifically programmed or configured to execute the algorithms and processes described herein. The processor(s) 108 can be configured to fetch and execute computer-readable instructions stored in the computer-readable media, which can program the processor(s) to perform the functions described herein.

The computer-readable media 110 can include volatile, nonvolatile, removable, and/or non-removable memory or other media implemented in any type of technology for storage of data, such as computer-readable instructions, data structures, program modules, or other data. Such computer-readable media 110 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired data and that can be accessed by a computing device. Depending on the configuration of the server(s) 102, the computer-readable media 110 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 110 can be used to store any number of functional components that are executable by the processor(s) 108. In many implementations, these functional components comprise instructions or programs that are executable by the processor(s) 108 and that, when executed, specifically configure the processor(s) 108 to perform the actions attributed above to the server(s) 102. Functional components stored in the computer-readable media can optionally include a presentation management component 116, a channel management component 118, a direct message management component 119, an operating system 120, and a datastore 122.

In at least one example, the presentation management component 116 can determine presentation characteristics for presenting messages, user interfaces, and/or other data of the communication platform. In at least one example, the presentation management component 116 can receive a message, which can be associated with one or more identifiers. In at least one example, the one or more identifiers can indicate a channel, direct message, or board with which the message is associated (e.g., is to be posted to). In at least one example, each channel identifier, direct message identifier, board identifier, and/or the like can be mapped to or otherwise associated with one or more user identifiers indicating members of the channel, direct message, board, and/or the like. Members associated with a channel, direct message, board, and/or the like can be associated with a set of permissions that enable the members to communicate and/or otherwise interact via the channel, direct message, board, and/or the like without non-members being able to view contents of the channel, direct message, board, and/or the like.

As described above, in at least one example, a message can be associated with a recipient virtual space identifier (e.g., channel identifier, direct message identifier, board identifier, etc.) and recipient user identifier(s). In at least one example, the presentation management component 116 can utilize the recipient user identifier(s) to determine (i) characteristic(s) of the recipient user(s) and (ii) presentation characteristics for displaying the message to the recipient user(s). In at least one example, the presentation management component 116 can access user data associated with recipient user(s) using the recipient user identifier(s). The user data can be arranged in user profiles, as described below. In at least one example, user data associated with a user profile of a recipient user can be used to determine characteristic(s) of the recipient user. In at least one example, such characteristic(s) can comprise roles of the users, user types of the users, condition satisfaction, authentication, verification, group and/or team membership, user preferences of the users, and/or other user characteristics of the users. In some examples, the presentation management component 116 can use additional or alternative data, which may not be stored in association with user profiles, to determine user characteristics. For instance, in at least one example, the presentation management component 116 can use an organizational chart to determine user characteristics. In some examples, the presentation management component 116 can utilize other data associated with users to determine user characteristics.

In at least one example, the presentation management component 116 can determine presentation characteristic(s) of the message based at least in part on characteristic(s) of the recipient user. In some examples, the message can be presented differently to individual of the recipient user(s) based at least in part on different characteristic(s) of the recipient user(s). In at least one example, the presentation management component 116 can send instruction(s) to a client of a recipient user to cause the message to be displayed in accordance with presentation characteristic(s) particular to the recipient user. In some examples, as described below, a message can be restricted for a particular user such that the user is not permitted to view at least a portion of the message. In such examples, the restricted portion of the message can be obfuscated such that the particular user is not able to view the corresponding contents of the message. That is, the restricted portion of the message is not visible to the particular user. In some examples, a message that is restricted for a particular user can be omitted from presentation via the user interface entirely. In some examples, inaccessible contents can be presented but with disabled mechanisms such that the contents are not accessible to a particular user who is not permitted to access them. In some examples, messages can be associated with mechanisms to enable users to perform a task or other operation, as described below.

In some examples, such a restriction can be based on a determination that the particular user has not satisfied a condition. Examples of conditions include signed documents (e.g., non-disclosure agreements, etc.), completed trainings, completed certifications, authentications, verifications, and/or the like. In some examples, a restricted message can be presented in association with a prompt or other instruction for the user to satisfy the condition. In some examples, the message can include a mechanism to enable the user to satisfy the condition, for example, by including a link to a document that needs to be signed, an embedding of a video or other content that needs to be watched, a link to a training program that needs to be completed, a trigger to a workflow, a log-in to facilitate authentication and/or verification, and/or the like. In some examples, the presentation management component 116 can receive an indication that the condition has been satisfied and can send an instruction to the client to cause a previously restricted message to be presented without restriction.

In some examples, the presentation management component 116 can utilize one or more rule(s) to determine presentation characteristics for presenting messages via the communication platform. For instance, in some examples, messages can be associated with indications of user characteristics of users that are permitted to view contents of the messages. That is, in some examples, messages can be associated with permissions designating user characteristics of users that are permitted to view contents of such messages and/or presentation characteristics associated therewith. In some examples, the presentation management component 116 can learn (e.g., using machine learning mechanism(s)) which messages are likely to be associated with restrictions for particular users. For instance, the presentation management component 116 can learn that a message associated with legalese is likely to be associated with a restriction such that users associated with the role "attorney" are permitted to view the message but users associated with an external organization or "contractor role" are not permitted to view the message. In some examples, the presentation management component 116 can utilize one or more machine-trained models to determine presentation characteristics for presenting messages via the communication platform.

In some examples, the presentation management component 116 can determine presentation characteristics associated with a user interface of the communication platform. For example, the presentation management component 116 can determine characteristic(s) of a user and can determine presentation characteristic(s) for presenting the user interface via a client of the user. In some examples, such characteristic(s) can determine which functionality and/or control(s) are available via the user interface. In some examples, such characteristic(s) can determine which virtual spaces are represented via the user interface. In some examples, user interface elements presented via the user interface can be determined based at least in part on such characteristic(s).

In some examples, the presentation management component 116 can utilize user characteristic(s) as described above to determine differentiated presentation characteristics for messages, user interfaces, and/or other aspects of the communication platform. In some examples, the presentation management component 116 can utilize additional or alternative context data. For example, the presentation management component 116 can utilize topics associated with messages, content of messages (e.g., whether messages are associated with files or references to other users), senders of messages, characteristics of such senders, dates, times, permissions, and/or the like to determine presentation characteristics for presenting messages via the communication platform.

As described above, while reference is made to differentiated presentation of messages associated with the communication platform, techniques described herein can be similarly applicable to other objects of the communication platform. For instance, the presentation management component 116 can utilize user data and/or other context data to cause differentiated presentation of such objects such that such objects can be displayed in accordance with different presentation characteristics.

In at least one example, the channel management component 118 can manage channels of the communication platform. In at least one example, the communication platform can be "channel-based" such that the platform can be organized into channels having security (that can be defined by permissions) to limit access to defined groups of users (e.g., members of the channels). A channel, or virtual space, can be a data route used for exchanging data between and among systems and devices associated with the communication platform such as, for example, content and/or messages. In some examples, a channel may be "public," which may allow any user within a group (e.g., associated with an organization identifier, associated with a workspace identifier, etc.) with which the channel is associated to join and participate in the data sharing through the channel. In some examples, a channel may be "private," which may restrict data communications in the channel to certain users or users having particular roles (e.g., managers, administrators, etc.) and/or types (e.g., verified, administrator, etc.). In some examples, a channel may be an "announcement" channel, which may restrict communication in the channel to announcements or may otherwise be associated with announcements instead of other more granular topics of other channels.

In at least one example, a channel can be associated with a defined group of users within the same organization. Such a channel can be an "internal channel" or an "internally shared channel." In some examples, a channel may be "shared" or "externally shared," which may allow users associated with two or more different groups (e.g., entities associated with two or more different organization and/or workspace identifiers) to join and participate in the data sharing through the channel. A shared channel may be public such that it is accessible to any user of groups associated with the shared channel, or may be private such that it is restricted to access by certain users or users having particular roles and/or types. A "shared channel" or an "externally shared channel" can enable two or more organizations, such as a first organization and a second organization to share data, exchange communications, and the like (hence, a "shared" channel or an "externally shared channel" refers to a channel which is accessible across different organizations, whereas an "internal channel" refers to a communication channel which is accessible within a same organization). In an example, the first organization and the second organization can be associated with different organization identifiers, can be associated with different business entities, have different tax identification numbers, and/or otherwise can be associated with different permissions such that users associated with the first organization and users associated with the second organization are not able to access data associated with the other organization, without the establishment of an externally shared channel. In some examples, a shared channel can be shared with one or more different workspaces and/or organizations that, without having a shared channel, would not otherwise have access to each other's data by the nature of the permission-based and/or group-based configuration of the communication platform described herein.

In at least one example, the channel management component 118 can receive a request to generate a channel. In some examples, the request can include a name that is to be associated with the channel, one or more users to invite to join the channel, and/or permissions associated with the channel. In at least one example, one or more user identifiers associated with one or more users and/or one or more user accounts can be mapped to, or otherwise associated with, a channel (e.g., a channel identifier associated therewith). User(s) associated with a channel can be "members" of the channel. Members of a channel can communicate with other members via the channel. That is, in at least one example, the channel management component 118 can establish a channel between and among various user computing devices associated with user identifiers associated with the channel, allowing the user computing devices to communicate and share data between and among each other. As described herein, in some examples, such communication and/or sharing of data can be via one or more messages that can be exchanged via a channel. In at least one example, the channel management component 118 can manage such communications and/or sharing of data. In some examples, data associated with a channel can be presented via a user interface.

As described above, in at least one example, one or more permissions can be mapped to, or otherwise associated with, a channel and/or members associated therewith. Such permission(s) can indicate which user(s) have permission to access the channel, actions and/or messages permitted in the channel, which user(s) and/or type(s) of users are permitted to add or remove members, which user(s) and/or types of users are permitted to share the channel with other users, a retention policy associated with data in the channel, whether the channel is public or private, or the like.

In at least one example, the direct message management component 119 can manage "direct messages," which can comprise communications with individual users or multiple specified users (e.g., instead of all, or a subset of, members of an organization). In at least one example, a "direct message" can comprise a data route, or virtual space, used for exchanging data between and among systems and devices associated with the communication platform (e.g., content and/or messages). In some examples, a direct message can be a private message between two or more users of the communication platform. In some examples, a direct message may be "shared," which may allow users associated with two or more different groups (e.g., entities associated with two or more different organization and/or workspace identifiers) to join and participate in the data sharing through the direct message.

In at least one example, the direct message management component 119 can receive a request to generate a direct message. In some examples, the request can include identifiers associated with one or more users that are intended recipient(s) (e.g., recipient user(s)) of the direct message. In at least one example, one or more user identifiers associated with one or more users and/or one or more user accounts can be mapped to, or otherwise associated with, a direct message (e.g., or direct message identifier associated therewith). User(s) associated with a direct message can communicate with one another and/or otherwise share data with one another via the direct message. As described herein, in some examples, such communication and/or sharing of data can be via one or more messages that can be exchanged via the direct message. In at least one example, the direct message management component 119 can manage such communications and/or sharing of data. In some examples, data associated with a direct message can be presented via a user interface.

In at least one example, the operating system 120 can manage the processor(s) 108, computer-readable media 110, hardware, software, etc. of the server(s) 102.

In at least one example, the datastore 122 can be configured to store data that is accessible, manageable, and updatable. In some examples, the datastore 122 can be integrated with the server(s) 102, as shown in FIG. 1. In other examples, the datastore 122 can be located remotely from the server(s) 102 and can be accessible to the server(s) 102 and/or user device(s), such as the user device 104. The datastore 122 can comprise one or multiple databases, which can include user data 124, permission data 126, channel data 128, and direct message (DM) data 130. Additional or alternative data may be stored in the datastore and/or one or more other datastores.

In at least one example, the user data 124 can store data associated with users of the communication platform. In at least one example, the user data 124 can store data in user profiles (which can also be referred to as "user accounts"). In some examples, a user can be associated with a single user profile. In some examples, a user can be associated with multiple user profiles. A user profile can store data associated with a user, including, but not limited to, one or more user identifiers associated with multiple, different organizations, groups, or entities with which the user is associated, one or more group identifiers for groups (or, organizations, teams, entities, or the like) with which the user is associated, one or more channel identifiers associated with channels to which the user has been granted access, an indication whether the user is an owner or manager of any channels, an indication whether the user has any channel restrictions, one or more direct message identifiers associated with direct messages with which the user is associated, one or more board identifiers associated with boards with which the user is associated, a plurality of messages, a plurality of emojis, a plurality of conversations, a plurality of conversation topics, an avatar, an email address, a real name (e.g., John Doe), a username (e.g., j doe), a password, a time zone, a status, and the like.

In some examples, the user data 124 can store indications of user preferences, which can be explicitly indicated or learned. In some examples, the user data 124 of a user can indicate a role or position of a user, which can be determined based at least in part on an organizational chart and/or learned. In some examples, an organizational chart can be a data structure that represents the structure of an organization and relationships and/or relative ranks of its parts and/or positions (i.e., roles). In some examples, an organizational chart can be provided by an organization with which the user is associated. In some examples, the communication platform can analyze messaging and/or other interaction data to determine relationships between users and/or relative ranks and can infer organizational charts. In some examples, workspaces, teams, or other groups can be associated with similar data structures representing structure, relationships, and/or relative ranks of roles within the workspaces, teams, or other groups. In some examples, the user data 124 of a user can indicate a user type of the user, for example, whether the user is an administrator, a verified user, and/or the like. In at least one example, user type can be a designation provided by the communication platform (e.g., wherein roles can be designated by organizations, workspaces, teams, and/or other groups). In some examples, the communication platform can store indications of which users and/or virtual spaces a user communicates with and/or in, a frequency of such communication, topics associated with such communications, reactions and/or feedback associated with such communications and/or the like. In some examples, the user data 124 can store indications of trainings completed, documents signed, and/or other indications of conditions satisfied. In some examples, the user data 124 can store indications of authentications, verifications, and/or the like.

In at least one example, the permission data 126 can store data associated with permissions of individual users of the communication platform. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. In some examples, permissions associated with an individual user can be mapped to, or otherwise associated with, a profile and/or account associated with the user data 124. In some examples, permissions can indicate which users can communicate directly with other users, which channels a user is permitted to access, restrictions on individual channels, which workspaces the user is permitted to access, restrictions on individual workspaces, and the like. In at least one example, the permissions can support the communication platform by maintaining security for limiting access to a defined group of users. In some examples, such users can be defined by common access credentials, group identifiers, or the like, as described above.

In some examples, the permission data 126 can store data associated with permissions of groups associated with the communication platform. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. In some examples, permissions associated with a group can be mapped to, or otherwise associated with, data associated with the group. In some examples, permissions can indicate restrictions on individual groups, restrictions on channel(s) associated with individual groups, restrictions on user(s) associated with individual groups, and the like. In at least one example, the permissions can support the communication platform by maintaining security for limiting access to a defined group of users. In some examples, such groups can be defined by common access credentials, group identifiers, or the like, as described above.

In some examples, the permission data 126 can store data associated with permissions of individual channels. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. In some examples, permissions associated with a channel can be mapped to, or otherwise associated with, data associated with the channel in the channel data 128. In some examples, permissions can indicate restrictions on individual channels, restrictions on user(s) associated with individual channels, and the like.

In at least one example, the channel data 128 can store data associated with individual channels. In at least one example, the channel management component 118 can establish a channel between and among various user computing devices, allowing the user computing devices to communicate and share data between and among each other. In at least one example, a channel identifier may be assigned to a channel, which indicates the physical address in the channel data 128 where data related to that channel is stored.

In at least one example, the DM data 130 can store data associated with individual direct messages. In at least one example, the direct message management component 119 can establish a direct message between and among various user computing devices, allowing the user computing devices to communicate and share data between and among each other via the direct message. In at least one example, a direct message identifier may be assigned to a direct message, which indicates the physical address in the DM data 130 where data related to that direct message is stored.

Messages posted, or otherwise sent and/or received, via channels, direct messages, etc. can be stored in associated with the channel data 128 and/or DM data 130. In some examples, such messages can additionally or alternatively be stored in association with the user data 124. In some examples, messages can be associated with individual permissions, as described herein.

The datastore 122 can store additional or alternative types of data, which can include, but is not limited to board data (e.g., data posted to or otherwise associated with boards of the communication platform), interaction data (e.g., data associated with additional or alternative interactions with the communication platform), model(s) (e.g., trained as described herein), etc.

In some examples, the datastore 122 can be partitioned into discrete items of data that may be accessed and managed individually (e.g., data shards). Data shards can simplify many technical tasks, such as data retention, unfurling (e.g., detecting that message contents include a link, crawling the link's metadata, and determining a uniform summary of the metadata), and integration settings. In some examples, data shards can be associated with groups (e.g., organizations, workspaces), channels, direct messages, users, or the like.

In some examples, individual groups can be associated with a database shard within the datastore 122 that stores data related to a particular group identification. For example, a database shard may store electronic communication data associated with members of a particular group, which enables members of that particular group to communicate and exchange data with other members of the same group in real time or near-real time. In this example, the group itself can be the owner of the database shard and has control over where and how the related data is stored and/or accessed. In some examples, a database shard can store data related to two or more groups (e.g., as in a shared channel, such as an externally shared channel).

In some examples, a channel can be associated with a database shard within the datastore 122 that stores data related to a particular channel identification. For example, a database shard may store electronic communication data associated with the channel, which enables members of that particular channel to communicate and exchange data with other members of the same channel in real time or near-real time. In this example, a group or organization can be the owner of the database shard and can control where and how the related data is stored and/or accessed.

In some examples, a direct message can be associated with a database shard within the datastore 122 that stores data related to a particular direct message identification. For example, a database shard may store electronic communication data associated with the direct message, which enables a user associated with a particular direct message to communicate and exchange data with other users associated with the same direct message in real time or near-real time. In this example, a group or organization can be the owner of the database shard and can control where and how the related data is stored and/or accessed.

In some examples, individual users can be associated with a database shard within the datastore 122 that stores data related to a particular user account. For example, a database shard may store electronic communication data associated with an individual user, which enables the user to communicate and exchange data with other users of the communication platform in real time or near-real time. In some examples, the user itself can be the owner of the database shard and has control over where and how the related data is stored and/or accessed.

The communication interface(s) 112 can include one or more interfaces and hardware components for enabling communication with various other devices (e.g., the user computing device 104), such as over the network(s) 106 or directly. In some examples, the communication interface(s) 112 can facilitate communication via Web sockets, Application Programming Interfaces (APIs) (e.g., using API calls), Hyper Text Transfer Protocols (HTTPs), etc.

The server(s) 102 can further be equipped with various input/output devices 114 (e.g., I/O devices). Such I/O devices 114 can include a display, various user interface controls (e.g., buttons, joystick, keyboard, mouse, touch screen, etc.), audio speakers, connection ports and so forth.

In at least one example, the user computing device 104 can include one or more processors 132, computer-readable media 134, one or more communication interfaces 136, and input/output devices 138.

In at least one example, each processor of the processor(s) 132 can be a single processing unit or multiple processing units, and can include single or multiple computing units or multiple processing cores. The processor(s) 132 can comprise any of the types of processors described above with reference to the processor(s) 108 and may be the same as or different than the processor(s) 108.

The computer-readable media 134 can comprise any of the types of computer-readable media 134 described above with reference to the computer-readable media 110 and may be the same as or different than the computer-readable media 110. Functional components stored in the computer-readable media can optionally include at least one application 140 and an operating system 142.

In at least one example, the application 140 can be a mobile application, a web application, or a desktop application, which can be provided by the communication platform or which can be an otherwise dedicated application. In at least one example, the application 140 can be a native application associated with the communication platform. In some examples, individual user computing devices associated with the environment 100 can have an instance or versioned instance of the application 140, which can be downloaded from an application store, accessible via the Internet, or otherwise executable by the processor(s) 132 to perform operations as described herein. That is, the application 140 can be an access point, enabling the user computing device 104 to interact with the server(s) 102 to access and/or use communication services available via the communication platform. In at least one example, the application 140 can facilitate the exchange of data between and among various other user computing devices, for example via the server(s) 102. In at least one example, the application 140 can present user interfaces, as described herein. In at least one example, a user can interact with the user interfaces via touch input, keyboard input, mouse input, spoken input, or any other type of input. Additional or alternative access points, such as a web browser, can be used to enable the user computing device 104 to interact with the server(s) 102 as described herein. That is, in examples where the application 140 is described as performing an operation below, in an additional or alternative example, such an operation can be performed by another access point, such as a web browser or the like.

In at least one example, the user computing device 104 can correspond to a "client" of a user. In some examples, the user computing device 104 can be associated with multiple "clients," in which case, each instance of an application or other access point can be its own client. For example, a user can be signed into a first client (e.g., the application 140) and a second client (e.g., a web browser), both of which can be associated with the user computing device 104. In another example, the user can be signed into a first client (e.g., the application 140) and a second client, each of which can be on separate user computing devices.

As described above, a client, which can be associated with the user computing device 104, can present one or more user interfaces. A non-limiting example of a user interface 144 is shown in FIG. 1. As illustrated in FIG. 1, the user interface 144 can present data associated with one or more channels, direct messages, or other virtual spaces. In some examples, the user interface 144 can include a first section 146 (e.g., which can be a portion, pane, or other partitioned unit of the user interface 144), that includes user interface element(s) representing data associated with channel(s), direct message(s), etc. with which the user (e.g., account of the user) is associated. Additional details associated with the first section 146 and user interface element(s) are described below with reference to FIG. 2.

In at least one example, the user interface 144 can include a second section 148 (e.g., which can be a portion, pane, or other partitioned unit of the user interface 144) that can be associated with a data feed (or, "feed") indicating messages posted to and/or actions taken with respect to one or more channels, direct messages, and/or other virtual spaces for facilitating communications (e.g., a virtual space associated with event(s) and/or action(s), etc.) as described herein. In at least one example, data associated with the second section 148 can be associated with the same or different workspaces. That is, in some examples, the second section 148 can present data associated with the same or different workspaces via an integrated data feed. In some examples, the data can be organized and/or is sortable by date, time (e.g., when associated data is posted or an associated operation is otherwise performed), type of action and/or data, workspace, channel, user, topic, relevance metric, and/or the like. In some examples, such data can be associated with an indication of which user (e.g., member of the channel) posted the message and/or performed an action. In examples where the second section 148 presents data associated with multiple workspaces, at least some data can be associated with an indication of which workspace the data is associated with.

In at least one example, the first section 146 and the second section 148, in combination, can be associated with a "group-based communication user interface" from which a user can interact with the communication platform. Additional details associated with the user interface 144, the first section 146, and the second section 148, are described below with reference to FIG. 2.

As described above, a message (and/or the user interface 144) can be displayed differently based on characteristic(s) of user(s) of the communication platform. In FIG. 1, a message 150 posted by User L is restricted for viewing to User Z (i.e., the user whose client is presenting the user interface 144). As such, the message 150 is at least partially obfuscated (i.e., is not visible) and includes an indication that the user (i.e., User Z) does not have permission to view the contents of the message 150. In at least one example, the user (i.e., User Z) may have permission to view other contents of the channel, as presented via the second section 148, but may not be permitted to view the message 150. In some examples, another instance of the user interface 144 presented via another client may not have the contents of the message 150 obfuscated and/or may be configured with additional or alternative user interface elements, controls, features, and/or the like. Additional details associated with the user interface 144 and/or differentiated presentation of messages and/or user interface(s) are described below with reference to FIGS. 2-7.

In at least one example, the operating system 142 can manage the processor(s) 132, computer-readable media 134, hardware, software, etc. of the user computing device 104.

The communication interface(s) 136 can include one or more interfaces and hardware components for enabling communication with various other devices (e.g., the user computing device 104), such as over the network(s) 106 or directly. In some examples, the communication interface(s) 136 can facilitate communication via Websockets, APIs (e.g., using API calls), HTTPs, etc.

The user computing device 104 can further be equipped with various input/output devices 138 (e.g., I/O devices). Such I/O devices 138 can include a display, various user interface controls (e.g., buttons, joystick, keyboard, mouse, touch screen, etc.), audio speakers, microphones, cameras, connection ports and so forth.

While techniques described herein are described as being performed by the presentation management component 116, the channel management component 118, the direct message management component 119, and the application 140, techniques described herein can be performed by any other component, or combination of components, which can be associated with the server(s) 102, the user computing device 104, or a combination thereof.

Figure 2:
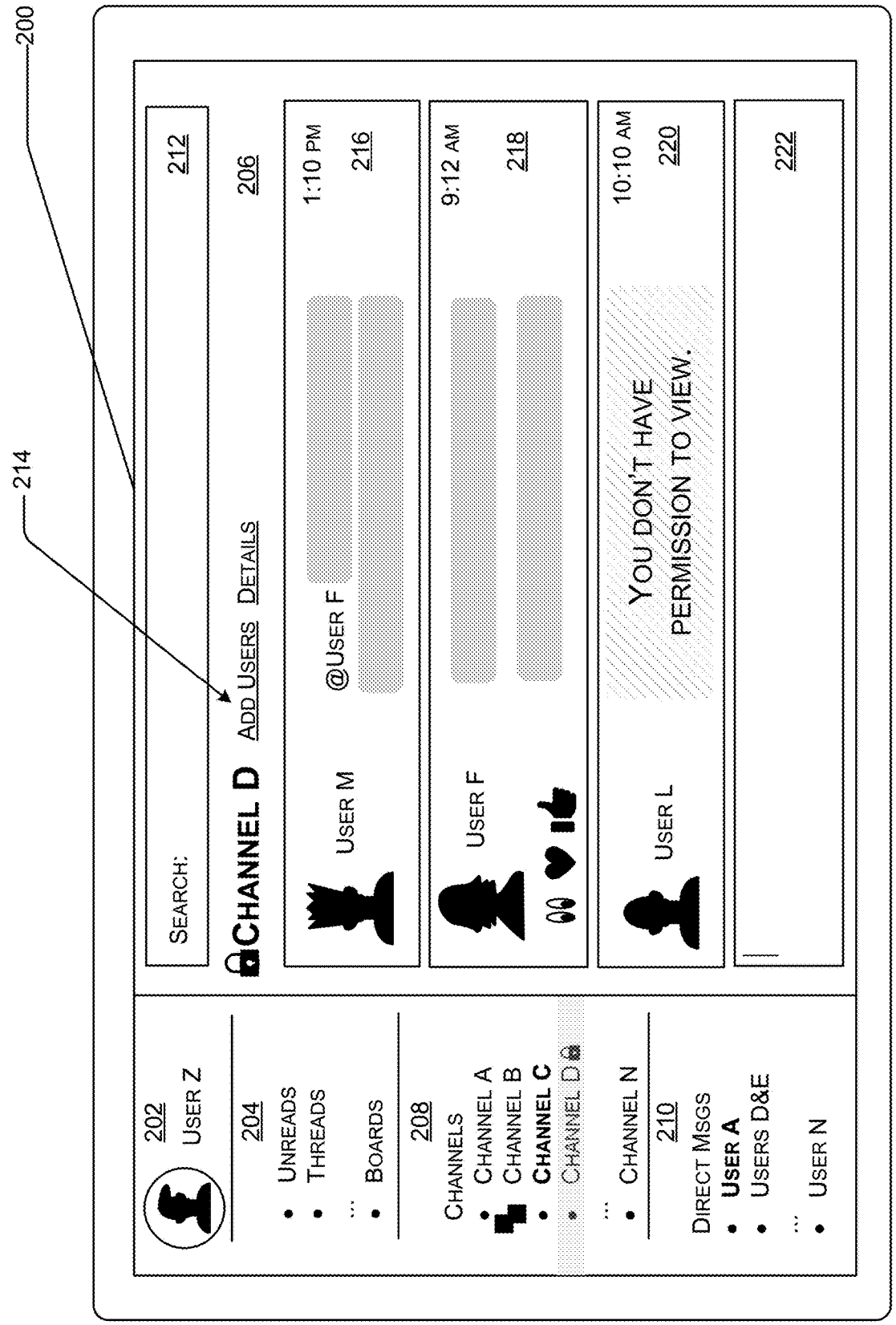
FIG. 2 illustrates an example user interface presented via a communication platform, as described herein.

FIG. 2 illustrates an example user interface 200 presented via a communication platform, as described herein. The user interface 200 can correspond to the user interface 144 described above with reference to FIG. 1. As described above, in some examples, a user interface 200 presented via the communication platform can include a first section 202 (which can correspond to the first section 146 described above with reference to FIG. 1) that includes user interface element(s) representing virtual space(s) associated with the workspace(s) with which the user (e.g., account of the user) is associated. In at least one example, the first section 202 can include one or more sub-sections, which can represent different virtual spaces. For example, a first sub-section 204 can include user interface elements representing virtual spaces that can aggregate data associated with a plurality of channels and/or workspaces. In at least one example, each virtual space can be associated with a user interface element in the first sub-section 204. In some examples, a user interface element can be associated with an actuation mechanism, that when actuated, can cause the application 140 to present data associated with the corresponding virtual space via a second section 206 of the user interface 200 (which can correspond to the second section 148 described above with reference to FIG. 1).

In at least one example, a virtual space can be associated with all unread data associated with each of the workspaces with which the user is associated. That is, in some examples, if the user requests to access the virtual space associated with "unreads," all data that has not been read (e.g., viewed) by the user can be presented in the second section 206, for example in a feed. In another example, "threads" can be associated with messages, files, etc. posted in threads to messages posted in a channel and/or a virtual space associated with "mentions and reactions" (e.g., "M & R") can be associated with messages or threads where the user (e.g., User F) has been mentioned (e.g., via a tag) or another user has reacted (e.g., via an emoji, reaction, or the like) to a message or thread posted by the user.

In some examples, if the first sub-section 204 includes a user interface element representative of a virtual space associated with "snippets of content" (e.g., stories) that is actuated by a user, snippets of content associated with the user, which can be associated with different channels and/or virtual spaces, can be presented via the second section 206. In some examples, such snippets of content can be presented via a feed. For the purpose of this discussion, a snippet of content can correspond to audio and/or video content provided by a user associated with the communication platform.

In another example, a virtual space can be associated with "boards" with which the user is associated. In at least one example, if the user requests to access the virtual space associated with "boards," one or more boards with which the user is associated can be presented via the user interface 200 (e.g., in the second section 206). In at least one example, boards, as described herein, can be associated with individual groups and/or communication channels to enable users of the communication platform to create, interact with, and/or view data associated with such boards. That is, a board, which can be an "electronic board," can be a virtual space, canvas, page, or the like for collaborative communication and/or organization within the communication platform. In at least one example, a board can support editable text and/or objects that can be ordered, added, deleted, modified, and/or the like. In some examples, a board can be associated with permissions defining which users of a communication platform can view and/or edit the board. In some examples, a board can be associated with a communication channel and at least some members of the communication channel can view and/or edit the board. In some examples, a board can be sharable such that data associated with the board is accessible to and/or interactable for members of the multiple communication channels, workspaces, organizations, and/or the like.

In at least one example, a board can include section(s) and/or object(s). In some examples, each section can include one or more objects. In at least one example, an object can be associated with an object type, which can include, but is not limited to, text (e.g., which can be editable), a task, an event, an image, a graphic, a link to a local object, a link to a remote object, a file, and/or the like. In some examples, the sections and/or objects can be reordered and/or otherwise rearranged, new sections and/or objects can be added or removed, and/or data associated with such sections and/or objects can be edited and/or modified. That is, boards can be created and/or modified for various uses. That is, users can customize and/or personalize boards to serve individual needs as described herein. As an example, sections and/or objects can be arranged to create a project board that can be used to generate and/or assign tasks, track progress, and/or otherwise manage a project. Further, in some examples, boards can present company metrics and also enable access to company goals so that such data can be stored and/or accessed via a single location. In some examples, boards can be used to keep track of work progress and/or career growth, which can be used by managers or supervisors for managing and/or supervising employees, agents, and/or other workers. In at least one example, a board can be used to track incidents, incoming customer service requests, and/or the like. Additional details associated with boards are provided in U.S. patent application Ser. No. 16/993,859, filed on Aug. 14, 2020, the entire contents of which are incorporated by reference herein.

In some examples, data presented via the second section can be organized and/or is sortable by date, time (e.g., when associated data is posted or an associated operation is otherwise performed), type of action and/or data, workspace, channel, user, topic, relevance metric, and/or the like.

In some examples, such data can be associated with an indication of which user (e.g., member of a channel) posted a message, performed an action, and/or the like. Additional details are described below.

In at least one example, the first section 202 of the user interface 200 can include a second sub-section 208 that includes user interface elements representing channels to which the user (i.e., user profile) has access. In some examples, the channels can include public channels, private channels, shared channels (e.g., between workspaces or organizations), single workspace channels, cross-workspace channels, announcement channels, combinations of the foregoing, or the like. In some examples, the channels represented can be associated with a single workspace. In some examples, the channels represented can be associated with different workspaces (e.g., cross-workspace). In some examples, the channels represented can be associated with combinations of channels associated with a single workspace and channels associated with different workspaces.

In some examples, the second sub-section 208 can depict all channels, or a subset of all channels, that the user has permission to access (e.g., as determined by the permission data 126). In such examples, the channels can be arranged alphabetically, based on most recent interaction, based on frequency of interactions, based on channel type (e.g., public, private, shared, cross-workspace, announcement, etc.), based on workspace, in user-designated sections, or the like. In some examples, the second sub-section 208 can depict all channels, or a subset of all channels, that the user is a member of, and the user can interact with the user interface 200 to browse or view other channels that the user is not a member of but are not currently displayed in the second sub-section 208. In some examples, a new communication channel, generated subsequent to a request received at the channel management component 118 in FIG. 1 and accessible to the user, can be added to the second sub-section 208. The new communication channel can be generated by the user or added to sub-section 208 in response to acceptance of an invite sent to the user to join a new communication channel. In some examples, different types of channels (e.g., public, private, shared, etc.) can be in different sections of the second sub-section 208, or can have their own sub-sections or sub-sections in the user interface 200. In some examples, channels associated with different workspaces can be in different portions of the second sub-section 208, or can have their own sections or sub-sections in the user interface 200.

In some examples, the indicators can be associated with user interface elements that visually differentiate types of channels. For example, Channel B is associated with a double square user interface element instead of a circle user interface element. As a non-limiting example, and for the purpose of this discussion, the double square user interface element can indicate that the associated channel (e.g., Channel B) is an externally shared channel. In some examples, such a user interface element can be the same for all externally shared channels. In other examples, such a user interface element can be specific to the other group with which the externally shared channel is associated. In some examples, additional or alternative graphical elements can be used to differentiate between public channels, private channels, shared channels, channels associated with different workspaces, and the like. In other examples, channels that the user is not a current member of may not be displayed in the second sub-section 208 of the user interface 200. In such examples, the user may navigate to a different interface (not shown) to browse additional channels that are accessible to the user but to which the user is not currently a member.

As described below, in at least one example, the second sub-section 208 can be updated based at least in part on changed characteristic(s) of the user. For example, based at least in part on a user changing roles, one or more channels may become available to the user and, in such an example, can be added to the second sub-section 208. As another example, based at least in part on a user changing roles, one or more channels may no longer be available to the user and, in such an example, can be removed from the second sub-section 208. Additional details are provided below.

In addition to the second sub-section 208, the first section 202 can include a third sub-section 210 that can include user interface elements representative of direct messages. That is, the third sub-section 210 can include user interface elements representative of virtual spaces that are associated with private messages between one or more users, as described above. Similar to as described above, changed characteristic(s) can cause changes to which direct messages a user has access to and which direct messages are presented via the third sub-section.

As described above, in at least one example, the user interface 200 can include a second section 206 that can be associated with data associated with virtual spaces of the communication platform. In some examples, data presented via the second section 206 can be presented as a feed indicating messages posted to and/or actions taken with respect to a channel and/or other virtual space (e.g., a virtual space associated with direct message communication(s), a virtual space associated with event(s) and/or action(s), etc.) for facilitating communications. As described above, in at least one example, data associated with the second section 206 can be associated with the same or different workspaces. That is, in some examples, the second section 206 can present data associated with the same or different workspaces via an integrated feed. In some examples, the data can be organized and/or is sortable by date, time (e.g., when associated data is posted or an associated operation is otherwise performed), type of action and/or data, workspace, channel, user, topic, relevance metric, and/or the like. In some examples, such data can be associated with an indication of which user posted the message and/or performed an action.

As described above, a "message" can refer to any electronically generated digital object provided by a user using the user computing device 104 and that is configured for display within a channel, a direct message, and/or another virtual space as described herein. In some examples, a user can comment on a message in a "thread." A thread can be a message associated with another message that is not posted to a channel, direct message, or other virtual space, but instead is maintained within an object associated with the original message. Messages and/or threads can be associated with file(s), emoji(s), reactji(s), application(s), etc.

A channel, direct message, or other virtual space can be associated with data and/or content other than messages, or data and/or content that is associated with messages. For example, non-limiting examples of additional data and/or content that can be presented via the second section 206 of the user interface 144 include members added to and/or removed from the channel, file(s) (e.g., file attachment(s)) uploaded and/or removed from the channel, application(s) added to and/or removed from the channel, post(s) (data that can be edited collaboratively, in near real-time by one or members of a channel) added to and/or removed from the channel, description added to, modified, and/or removed from the channel, modifications of properties of the channel, etc.

In some examples, the second section 206 can comprise a feed associated with a single channel. In such examples, data associated with the channel can be presented via the feed. In at least one example, data associated with a channel can be viewable to at least some of the users of a group of users associated with a same group identifier. In some examples, for members of a channel, the content of the channel (e.g., messaging communications and/or objects) can be displayed to each member of the channel. For instance, a common set of group-based messaging communications can be displayed to each member of the channel such that the content of the channel (e.g., messaging communications and/or objects) may not vary per member of the channel. In some examples, messaging communications associated with a channel can appear differently for different users (e.g., based on personal configurations, group membership, permissions, policies, etc.).

In at least one example, the format of the individual channels or virtual spaces may appear differently to different users. In some examples, the format of the individual channels or virtual spaces may appear differently based on which workspace or organization a user is currently interacting with or most recently interacted with. In some examples, the format of the individual channels or virtual spaces may appear differently for different users (e.g., based on personal configurations, group membership, permission(s), etc.).

In at least one example, the user interface 200 can include a search mechanism 212, wherein a user can input a search term and the server(s) 102 can perform a search associated with the communication platform. In some examples, the search can be performed across each group with which the user is associated, or the search can be restricted to a particular group, based on a user specification. The search may be performed with one or more shards associated with each group across which the search is performed.

In FIG. 2, the user can interact with the user interface element that corresponds to Channel D in the second sub-section 208 and as such, a feed associated with the channel can be presented via the second section 206 of the user interface. In some examples, the second section 206 can be associated with a header that includes user interface elements 214 representing data associated with Channel D. Furthermore, the second section 206 can include user interface elements 216, 218, and 220 which each represent messages posted to the channel. As illustrated, the user interface elements representative of the messages 216-220 can include an indication of a user who posted the message, a time when the message was posted, content associated with the message, reactions associated with the message (e.g., emojis, reactjis, etc.), and/or the like. In at least one example, the second section 206 can include an input mechanism 222, which can be associated with a composition user interface to enable a user to compose a message to be posted to the channel. That is, in at least one example, a user can provide input via the input mechanism 222 (e.g., type, speak, etc.) to generate a new message. In some examples, messages can be generated by applications and/or automatically by the communication platform. That is, in some examples, a message can be composed without using the composition user interface.

As described above, a message, such as the message 220, can be presented differently to different users, based at least in part on characteristics of the users. As illustrated in FIG.

2, User Z may not have permission to view contents of the message 220. In some examples, such a restriction may be based at least in part on group membership, role of the user, user type, a condition, authentication, verification, and/or the like. In some examples, the message 220 can be presented without any obfuscation via another instance of the user interface 200. That is, group membership, user role, user type, condition satisfaction, authentication, verification, etc. can be characteristics of users that can be used to determine presentation characteristics of messages presented thereto. In some examples, the presence or absence of particular characteristics can be used by the presentation management component 116 to determine differentiated presentation characteristics for presenting message(s) and/or other data via the user interface 200. FIGS. 3A-3E illustrate examples of differentiated presentation of message(s) associated with the user interface 200.

Techniques described herein refer to differentiated presentation of messages, user interfaces, and/or other aspects of the communication platform. In some examples, "differentiated presentation" can refer to presenting messages and/or other aspects with different presentation characteristics. In some examples, presentation characteristics can refer to size, color, orientation, interactability, visibility, and/or the like. For example, as described with reference to the message 220, a presentation characteristic associated therewith can cause at least a portion of the message to be obfuscated so that a user who is not permitted to view the portion of the message cannot view the portion of the message. In some examples, a presentation characteristic can cause a message to have a different size, orientation, contents, and/or the like. In some examples, a user or file associated with a message may be interactable in some examples and not interactable in other examples, based at least in part on presentation characteristics associated therewith.

Figure 3A:
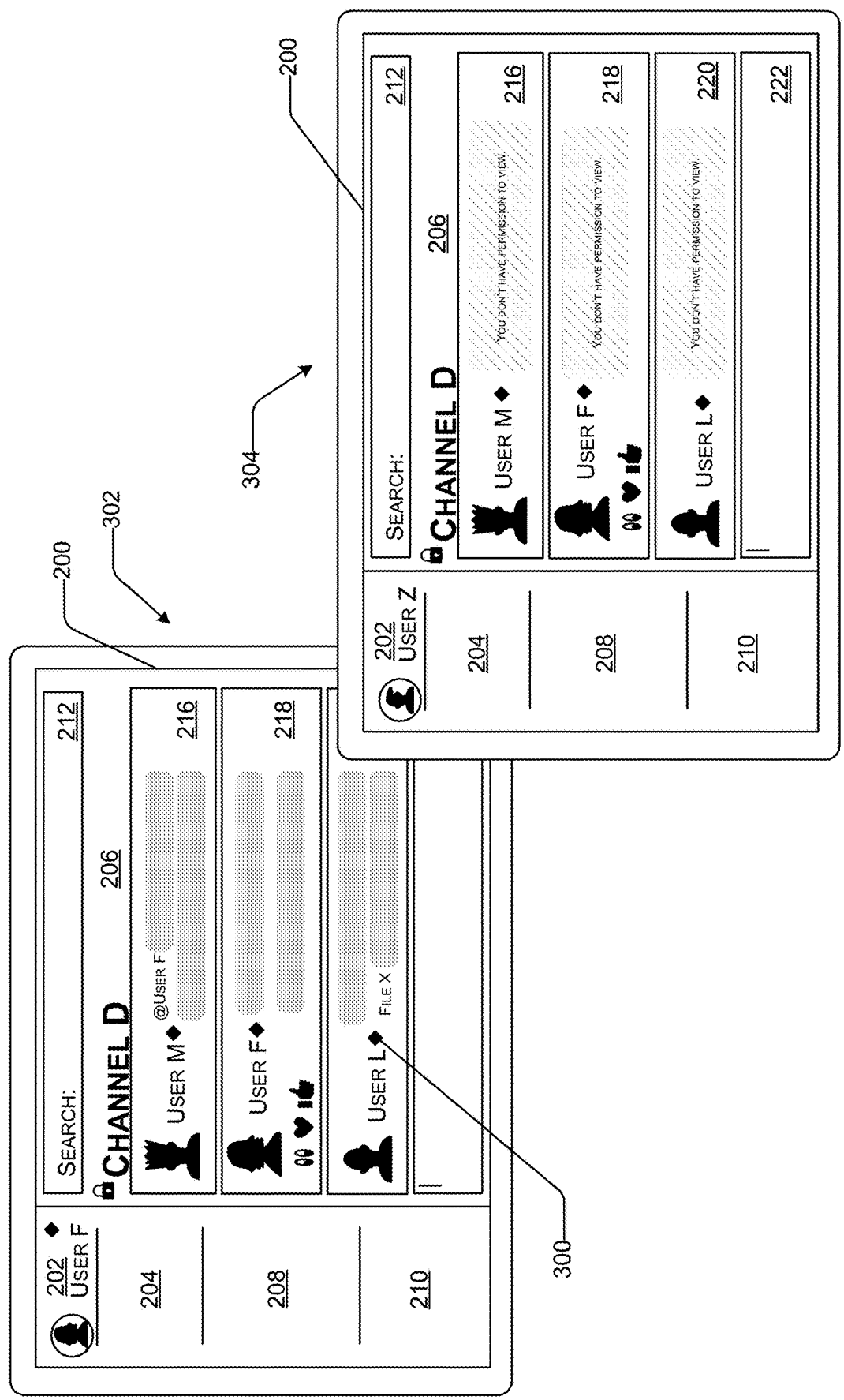
FIG. 3A illustrates an example of differentiated presentation of a message, via the user interface presented via different clients, as described herein.
Figure 3B:
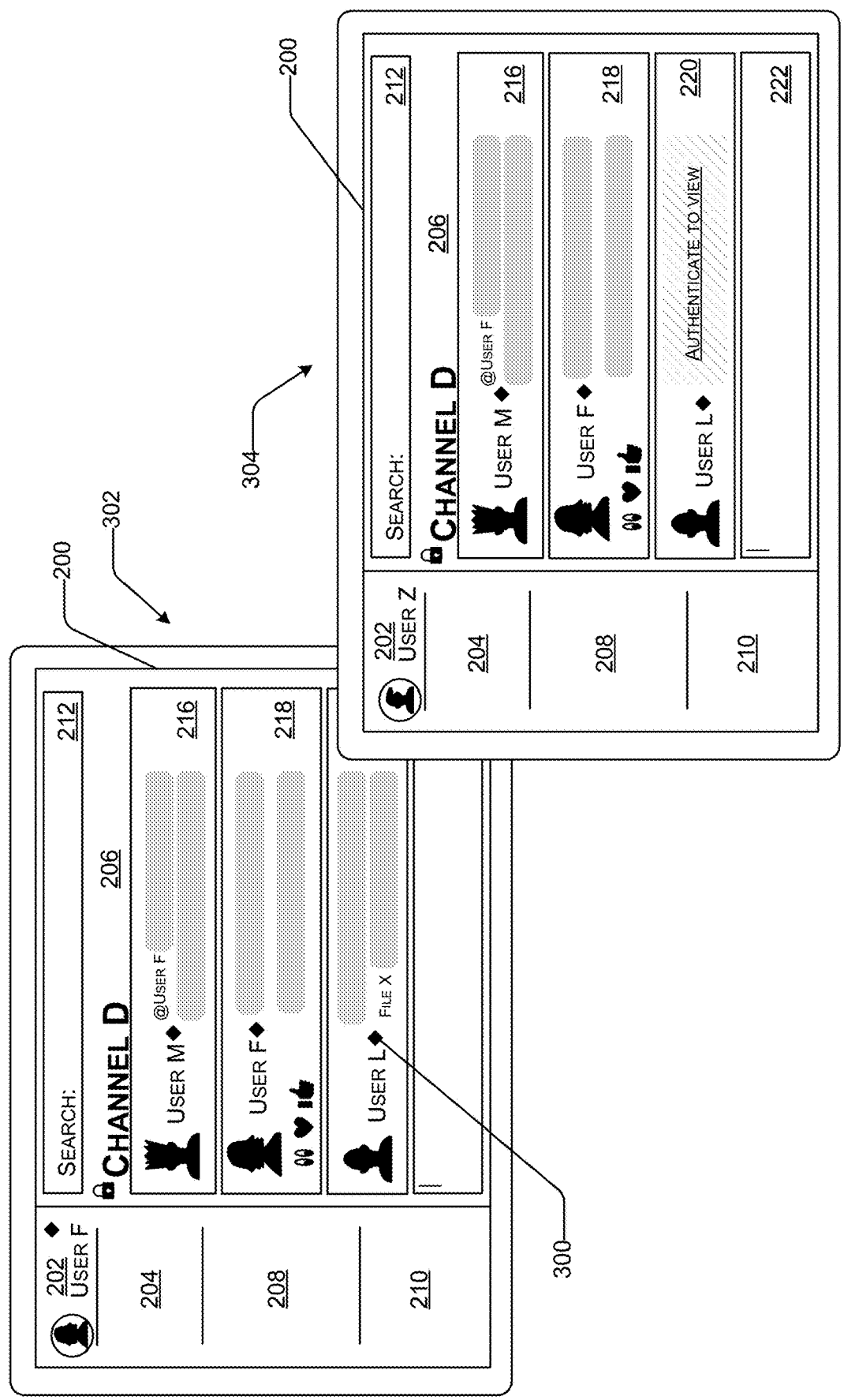
FIG. 3B illustrates another example of differentiated presentation of a message, via the user interface presented via different clients, as described herein.
Figure 3C:
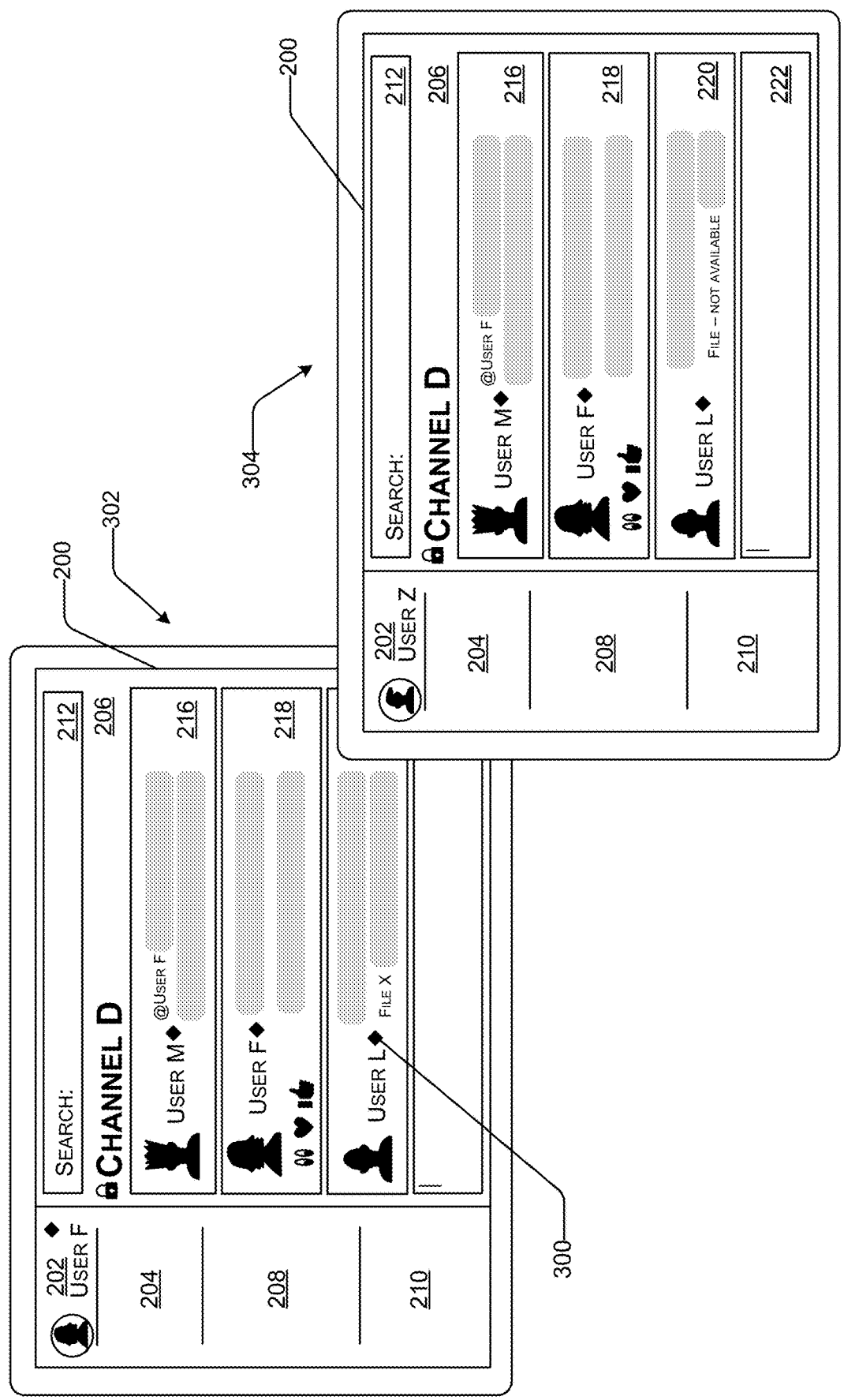
FIG. 3C illustrates yet another example of differentiated presentation of a message, via the user interface presented via different clients, as described herein.
Figure 3D:
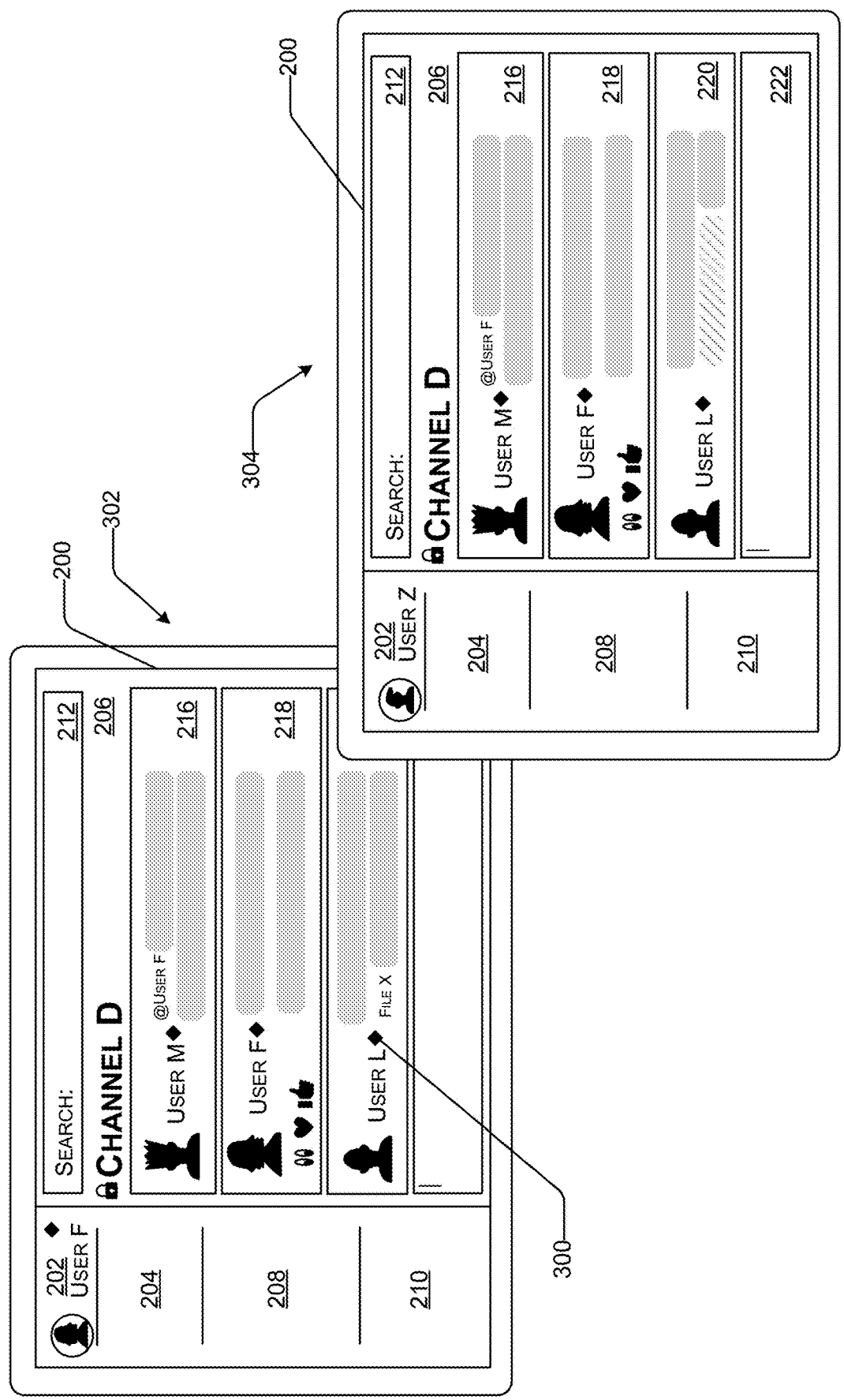
FIG. 3D illustrates yet another example of differentiated presentation of a message, via the user interface presented via different clients, as described herein.
Figure 3E:
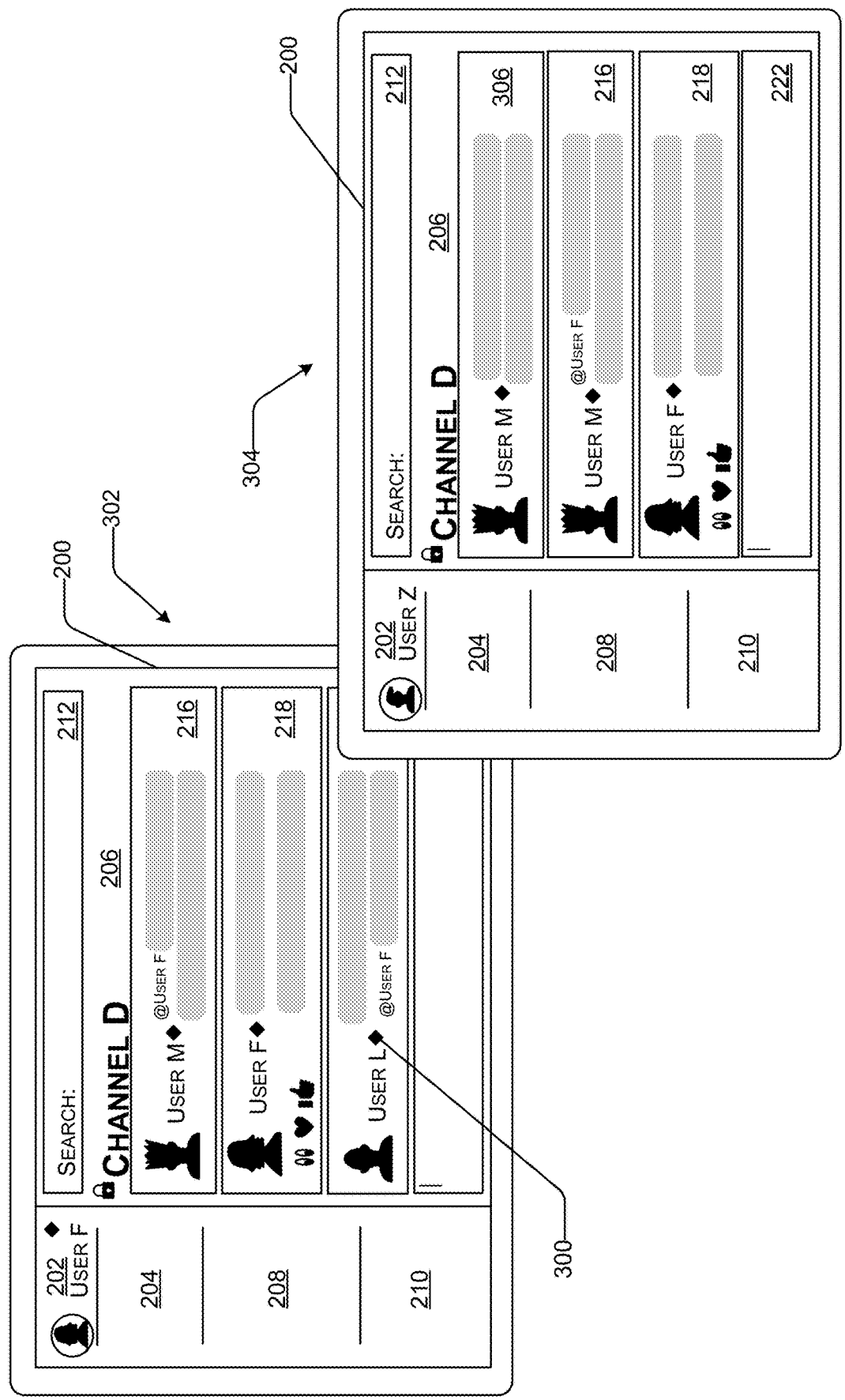
FIG. 3E illustrates yet another example of differentiated presentation of a message, via the user interface presented via different clients, as described herein.

FIGS. 3A-3E illustrate different examples of how the message 220 can be displayed, or in the case of FIG. 3E omitted completely, from the user interface 200 based at least in part on techniques described herein. Aspects of the user interface 200 described in FIG. 2 are omitted from the user interface 200 due to spatial constraints. In FIGS. 3A-3E, a user interface element 300 is illustrated, which represents an organization associated with the communication platform. User profiles (e.g., User F) and/or messages (216-220), each which are associated with the user interface element 300, can be associated with the organization.

In FIGS. 3A-3E, two instances of the user interface 200 are presented via two different clients 302, 304. In at least one example, the first client 302 is associated with a user (e.g., User F) that is associated with a first organization, as indicated by the instance of the user interface element 300 associated therewith. In at least one example, the second client 304 is associated with a user (e.g., User Z) that is not associated with the first organization (e.g., User Z does not have an instance of the user interface element 300 associated therewith). As illustrated in FIG. 3A, the contents of the messages 216-220 are viewable to a first user (e.g., User F) associated with the first client 302 but are not viewable to a second user (e.g., User Z) associated with the second client 304. Thus, FIG. 3A illustrates an example wherein messages can be displayed differently to users being associated with different organizations. In some examples, a user (e.g., User F and/or User Z) may see messages, but not attachments (e.g., files) or other types of media, reactions (e.g., emojis and/or reactjis), comments (e.g., threads), and/or the like depending on permission settings of respective organizations, workspaces, or the like. In some embodiments, a portion or all of a message may be obfuscated or blocked, as in the view of User Z, of FIG. 3A.

In at least one example, the presentation management component 116 can determine that the first user is associated with a first organization and the second user is associated with a second organization. In at least one example, such a determination can be made based at least in part on user profiles associated with each of the users. As such, the presentation management component 116 can determine a first presentation characteristic for presenting the messages 216-220 via the first client 302 and a second presentation characteristic for presenting the messages 216-220 via the second client 304. As described above, presentation characteristics can refer to size, color, orientation, interactability, visibility, and/or the like. In some examples, a presentation characteristic can refer to whether a message, a portion of a message, attachments and/or other data associated with a message, and/or the like are visible (or not). In at least one example, the messages 216-220 can be displayed in accordance with the first presentation characteristic by the first client 302 and the messages 216-220 can be displayed in accordance with the second presentation characteristic by the second client 304. The second presentation characteristic can cause the contents of the messages 216-220 to be obfuscated (i.e., not visible).

FIG. 3B illustrates an example wherein the second client 304 is not authenticated and the message 220 is not permitted to be viewed without authentication by the second client 304. That is, authentication can be a condition to viewing the contents of the message 220 and thus the contents of the message 220 may not be viewable until the second client 304 is authenticated. As such, as illustrated in FIG. 3B, the message 220 can be presented, via the second client 304, with a presentation characteristic that causes the message 220, or a portion thereof, to be obfuscated. In an example, authentication can be a condition to viewing contents of the message 220 if the contents of the message 220 are sensitive. That is, in such an example, the message 220 can be posted to a virtual space associated with an organization and can be restricted to viewing by a subset of users (e.g., users who have a need to know and are thus associated with permission(s) granting such viewing). In such an example, authentication can be a condition to viewing the contents of the message 220 and, until the user (e.g., User Z) has been authenticated, the contents of the message 220 can be obfuscated as illustrated in the second instance of the user interface 200 presented via the second client 304.

FIGS. 3C and 3D illustrate examples wherein User Z does not have permission to access a file associated with the message 220. In some examples, the file may not be available due to a permission associated with the file, the message, the channel, the organization, the user, etc. In FIG. 3C, the message 220 can include a reference to the file and an indication that the file is not available. In FIG. 3D, the reference to the file in the message 220 is obfuscated. That is, in each example, the message 220 can be presented via the second client 304 with a presentation characteristic that is different than the presentation characteristic with which the message 220 is presented via the first client 302. In at least one example, such a difference can be based at least in part different characteristics of the users (e.g., User F and User Z).

FIG. 3E illustrates an example wherein the message 220 is not presented via the user interface 200 on the second client 304. In some examples, if the presentation management component 116 determines that a user is not permitted to view the message 220 the presentation management component 116 can refrain from presenting the message 220 via the instance of the user interface 200 presented via the second client 304. In such an example, the user interface 200 presented via the second client 304 can include additional or alternative messages and/or other content than the instance of the user interface 200 presented via the first client 302. As illustrated in FIG. 3E, the second client 304 can include a message 306 which is not included in the feed presented via the first client 302. In such an example, the presentation characteristic associated with the message 220, as determined for User Z, can comprise refraining from presenting the message 220.

As described above, in some examples, a message can be presented with at least a portion of content associated therewith obfuscated or otherwise not available to a particular user. In some examples, a message can be presented with a prompt or other instruction for a user to perform an operation to view the contents of the message. In some examples, contents of a message and/or permission associated with viewing contents of a message can be conditioned. That is, in at least one example, the contents of the message and/or permission associated with view contents of the message can hinge on whether a condition has been satisfied. Examples of conditions include signed documents (e.g., non-disclosure agreements, etc.), completed trainings, completed certifications, authentications, verifications, and/or the like. That is, a user may not be permitted to view contents of a particular message unless or until a particular document is signed. As another example, a user may be required to complete a training prior to having permission to view contents of a message. That is, presentation characteristics of messages can be determined based at least in part on whether conditions have been satisfied.

Figure 4A:
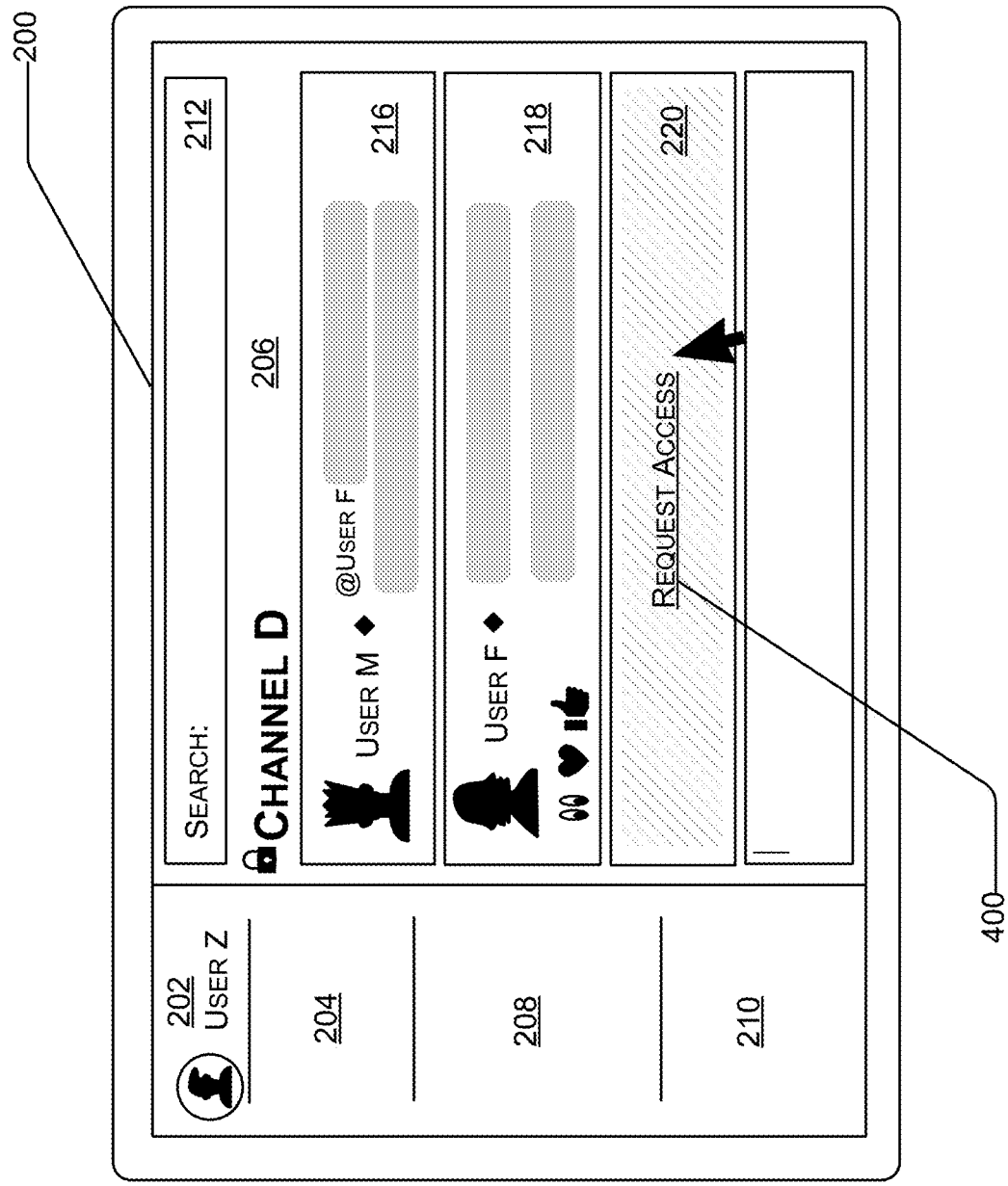
FIG. 4A illustrates an example of a user interface presented via a communication platform, as described herein, wherein a message is restricted for viewing based on context associated with the message.
Figure 4B:
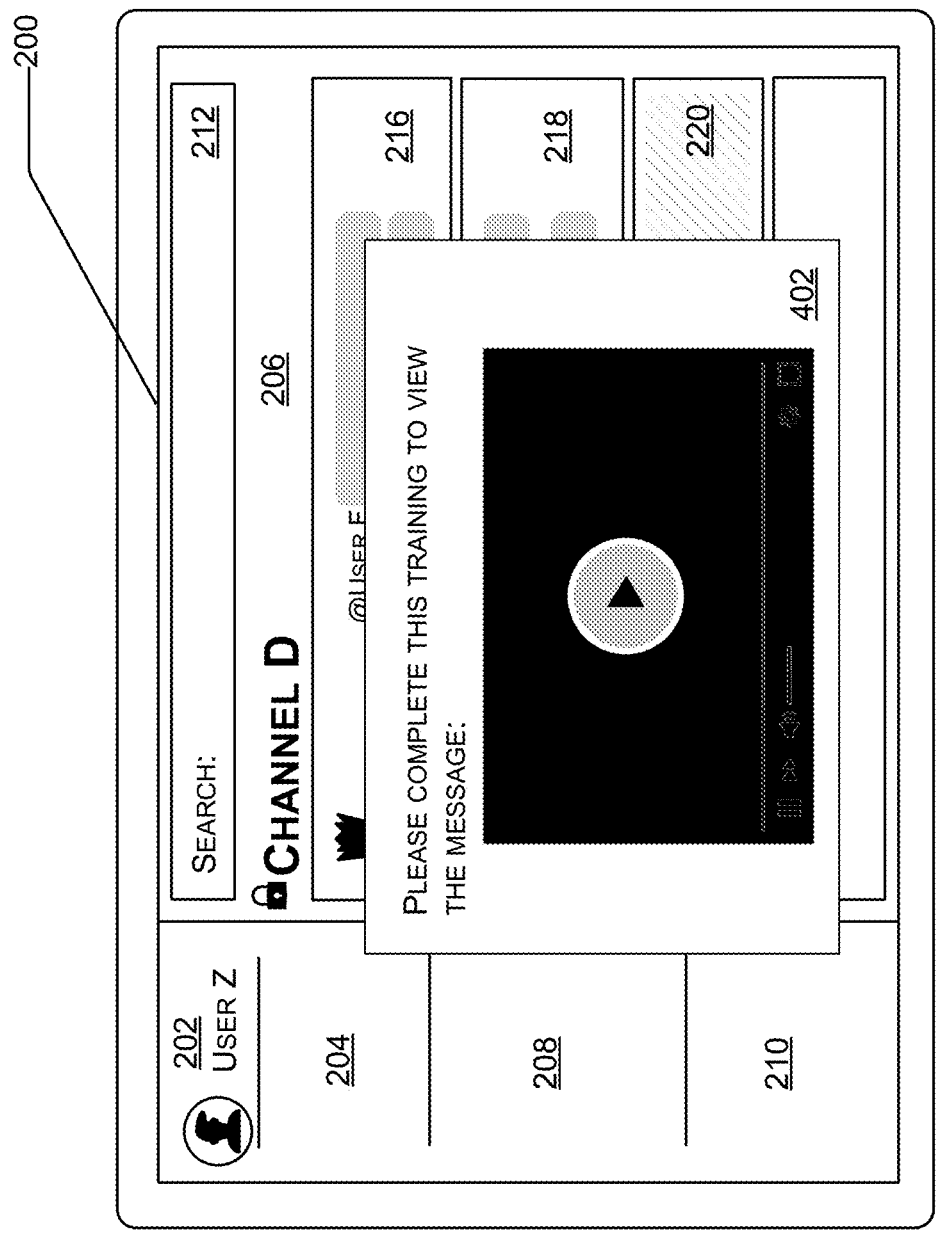
FIG. 4B illustrates an example of the user interface presented via the communication platform, as described herein, wherein a mechanism is provided to enable a user to satisfy a condition.
Figure 4C:
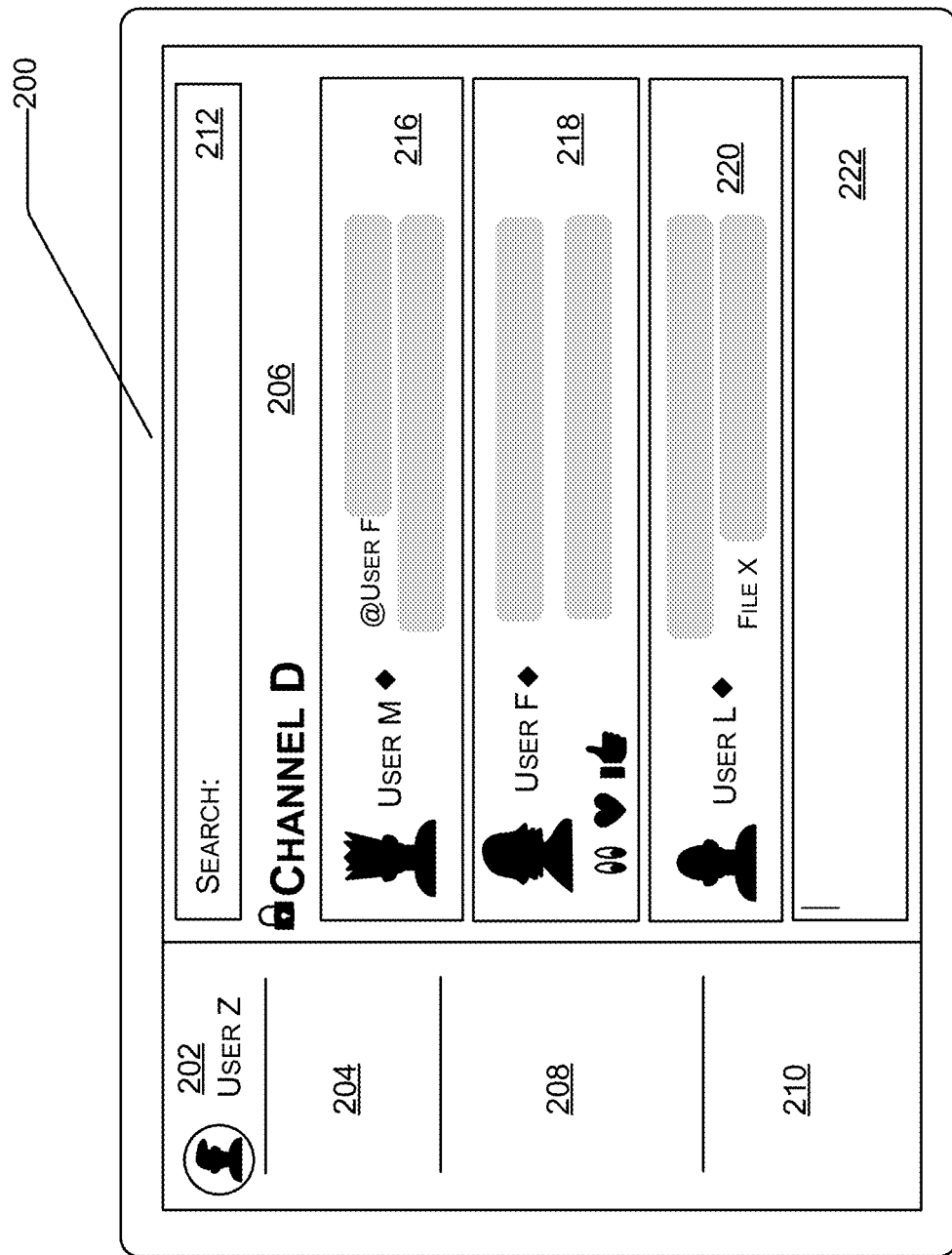
FIG. 4C illustrates an example of the user interface presented via the communication platform, as described herein, wherein the message is viewable based at least in part on satisfaction of a condition.

FIGS. 4A-4C illustrate an example of the user interface 200, wherein the contents of the message 220 are not viewable to User Z and as such, the contents are obfuscated as presented in FIG. 4A. However, the message 220 is associated with an actuation mechanism 400 that can enable the user to perform an operation and thereby access the contents of the message. In at least one example, based at least in part on detecting an actuation of the actuation mechanism 400, the presentation management component 116 can cause a user interface element 402 to be presented via the user interface 200, as illustrated in FIG. 4B. The user interface element 402 can be presented as a pop-up, overlay, portion of the user interface, new user interface, or the like. In at least one example, the user interface element 402 can enable the user to perform an operation (e.g., e-sign a document, watch a video, execute a workflow, provide authentication or verification credentials, etc.), which can satisfy a condition. In response to receiving an indication that the user performed the information, the presentation management component 116 can update the user interface 200 such that the contents of the message 220 are viewable to the user, as illustrated in FIG. 4C.

As described above, in some examples, messages and/or the user interface 200 can be presented with different presentation characteristics based at least in part on roles and/or user types. Roles can include, but are not limited to, president, vice president, senior vice president, director, associate director, assistant director, executive director, executive assistant, assistant, manager, direct report, team member, engineering, marketing, sales, legal, and so on. Roles can be determined based at least in part on an organizational chart, which, as described above, can be a data structure that represents the structure of an organization and relationships and/or relative ranks of its parts and/or positions (i.e., roles). In some examples, organizational charts can be provided by organizations associated with the communication platform. In some examples, the communication platform can analyze messaging and/or other interaction data to determine relationships between users and/or relative ranks, and can therefore infer organizational charts. In some examples, workspaces, teams, or other groups can be associated with similar data structures representing structure, relationships, and/or relative ranks of roles within the workspaces, teams, or other groups. In some examples, a user can be associated with multiple roles, depending on which virtual space and/or group the user is using to interact with the communication platform. That is, in some examples, the communication platform may determine a user's role based on the user's profile, workspace, channel, message, or context in which the user is in. In some embodiments, the communication platform may use machine learning to automatically determine a user's role at the time of use. In at least one example, a user's role can change based on how the user interacts with the communication platform. In at least one example, a user can have a first role in a first channel and a second role in a second channel. In some examples, the presentation management component 116 can cause differentiated presentation of messages based on particular roles.

In some examples, user type can indicate whether a user is an administrator user, non-administrator user, verified user, un-verified user, etc. In some examples, a user type can also correspond to a role or vice versa. In at least one example, user type can be a designation provided by the communication platform (e.g., wherein roles can be designated by organizations, workspaces, teams, and/or other groups). In at least one example, user types can be designated with different indicators. In some examples, user types can change based on how a user interacts with a communication platform. That is, in some examples, the communication platform may determine a user's user type based on the user's profile, workspace, channel, message, or context in which the user is in. In some embodiments, the communication platform may use machine learning to automatically determine a user's user type at the time of use. For example, a user can be associated with multiple user types depending on which virtual space and/or group the user is using to interact with the communication platform. In some examples, the presentation management component 116 can cause differentiated presentation of messages based on particular user types.

Figure 5:
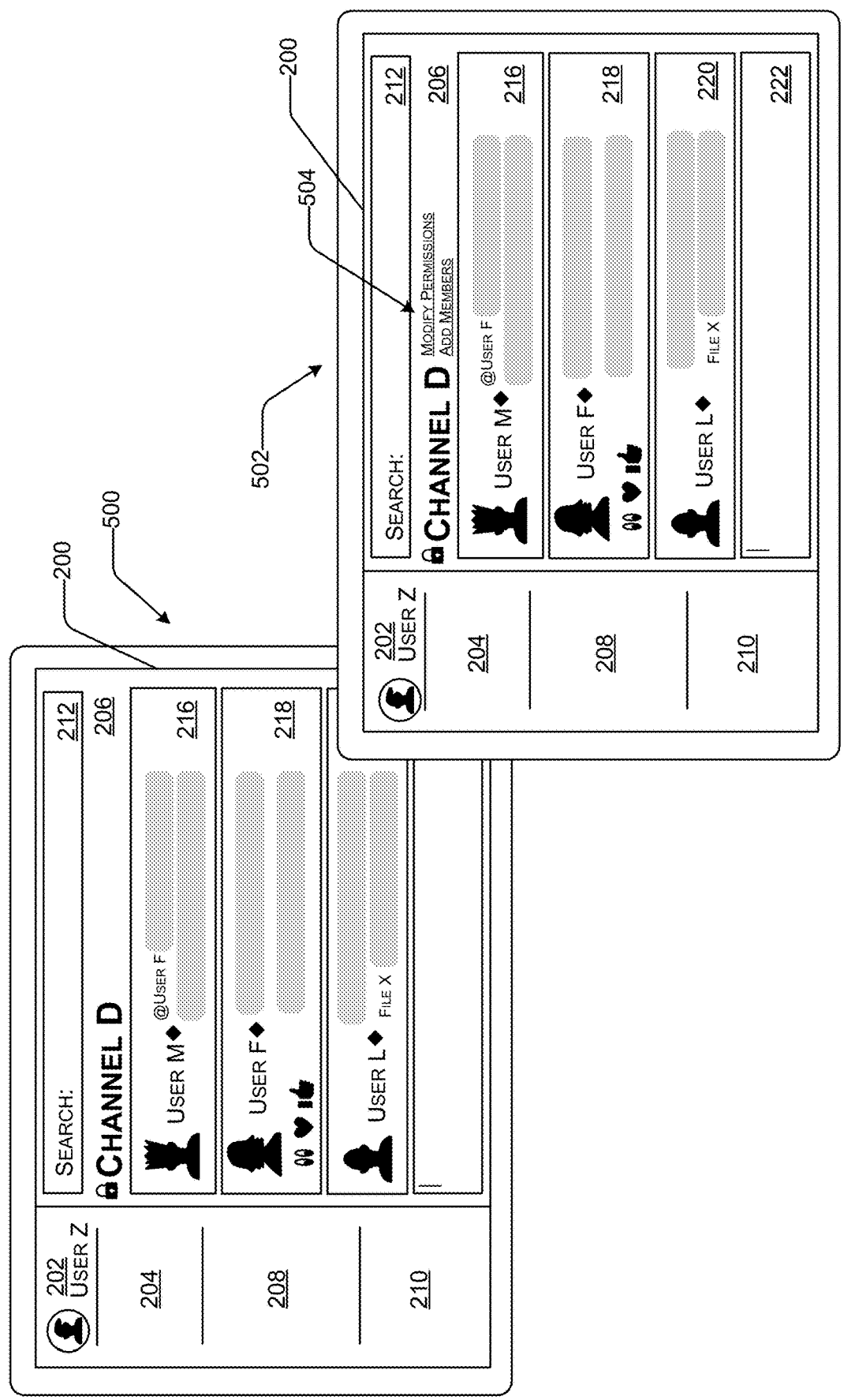
FIG. 5 illustrates an example of differentiated presentation of a user interface of a communication platform, as described herein, wherein additional controls and/or features are presented via the user interface based at least in part on a characteristic of the user.

In some examples, as illustrated in FIG. 5, the presentation management component 116 can cause differentiated presentation of the user interface 200 based at least in part on particular roles and/or user types. For instance, the first instance 500 of the user interface 200 has fewer controls and/or features than the second instance 502 of the user interface 200. As illustrated in FIG. 5, the second instance 502 of the user interface 200 includes one or more user interface elements 504 that are not included in the first instance 500 of the user interface 200. In at least one example, the user can be signed into a first user profile in the first instance 500 and a second user profile in the second instance 502. The first user profile may be associated with a first role that is different than a second role associated with the second user profile. As a non-limiting example, the second role can be a managerial role that enables the user to perform one or more operations. As another example, the first user profile may be associated with a non-administrator user type and the second user profile may be associated with an administrator user type. As such, the second instance 502 of the user interface 200 can include user interface element(s) 504 to enable the user to perform administrative functions.

In an alternative example, the first instance 500 and the second instance 502 of the user interface 200 can be presented at different times, wherein at a time when the first instance 500 is presented, the user is associated with different characteristic(s) than when the second instance 502 is presented. For instance, the user can be promoted or can change roles and/or user types between the first time and the second time. As such, the second instance 502 of the user interface 200 can include controls and/or features that are availed to the user based at least in part on their new role and/or user type. In some examples, a user can change roles and/or user types based on which virtual space the user is interacting with and/or which group the user is associated with at the time of an interaction with the communication platform.

Figure 6:
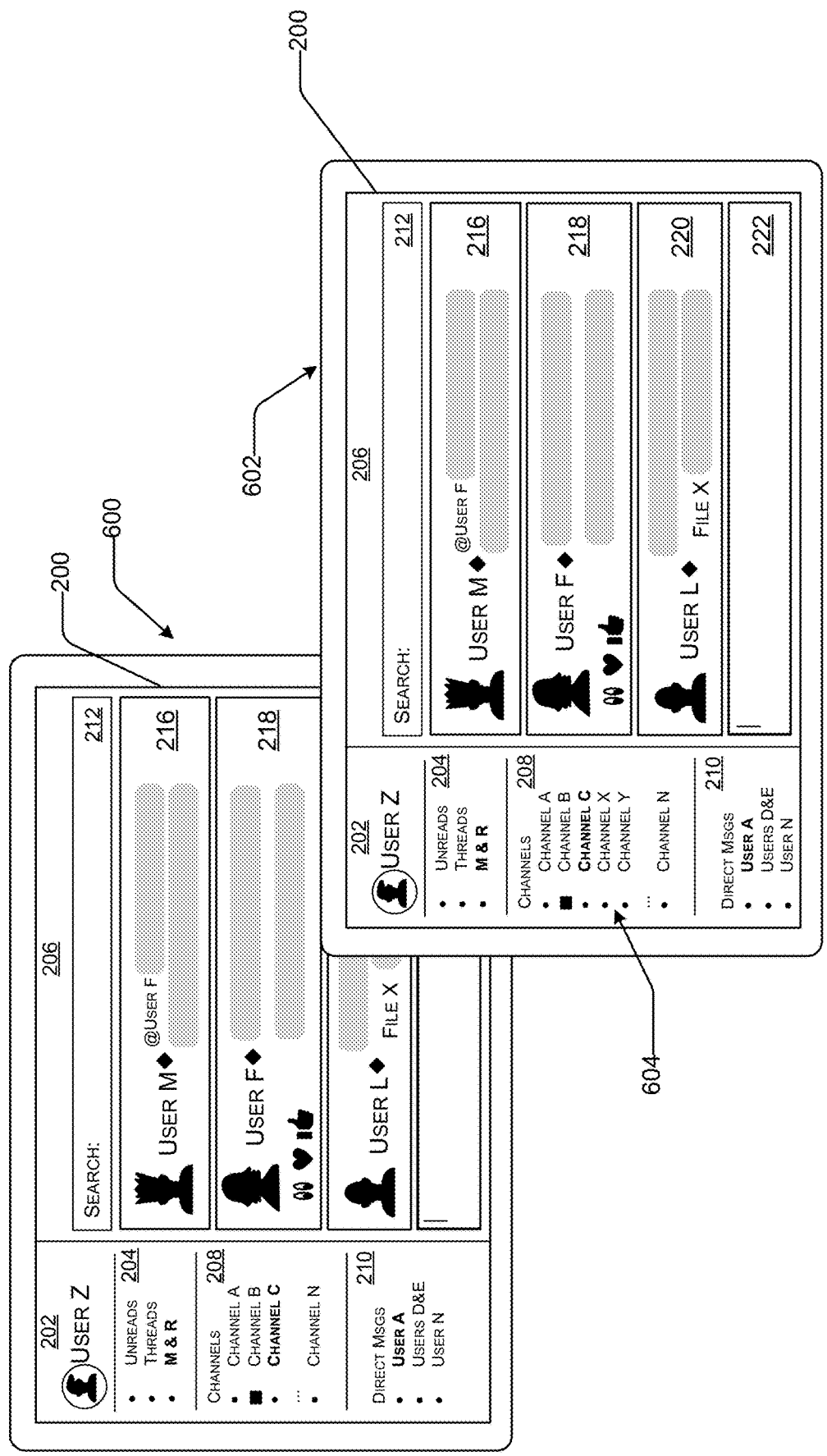
FIG. 6 illustrates an example of differentiated presentation of a user interface of a communication platform, as described herein, wherein additional channels are availed via the user interface based at least in part on a characteristic of a user.

In some examples, different characteristics can cause differentiated access to virtual spaces of the communication platform. FIG. 6 illustrates two instances of the user interface 200: a first instance 600 and a second instance 602. In at least one example, the user can be signed into a first user profile in the first instance 600 and a second user profile in the second instance 602. The first user profile may be associated with a first role that is different than a second role associated with the second user profile. As a non-limiting example, the second role can be a managerial role that enables the user to perform one or more operations. As another example, the first user profile may be associated with a non-administrator user type and the second user profile may be associated with an administrator user type. As such, the second instance 602 of the user interface 200 can include user interface element(s) 604 to enable the user to perform administrative functions. In at least one example, users associated with a particular role and/or user type can have permissions to access channels that other users (i.e., not associated with the particular role and/or user type) do not. As such, such channels can be presented in the second sub-section 208 of the first section 202 of the user interface 200.

In an alternative example, the first instance 600 and the second instance 602 of the user interface 200 can be presented at different times, wherein at a time when the first instance 600 is presented, the user is associated with different characteristic(s) than when the second instance 602 is presented. For instance, the user can be promoted or can change roles and/or user types between the first time and the second time. As such, the second instance 602 of the user interface 200 can include controls and/or features (e.g., new channels) that are availed to the user based at least in part on their new role and/or user type. In some examples, a user can change roles and/or user types based on which virtual space the user is interacting with and/or which group the user is associated with at the time of an interaction with the communication platform.

Figure 7:
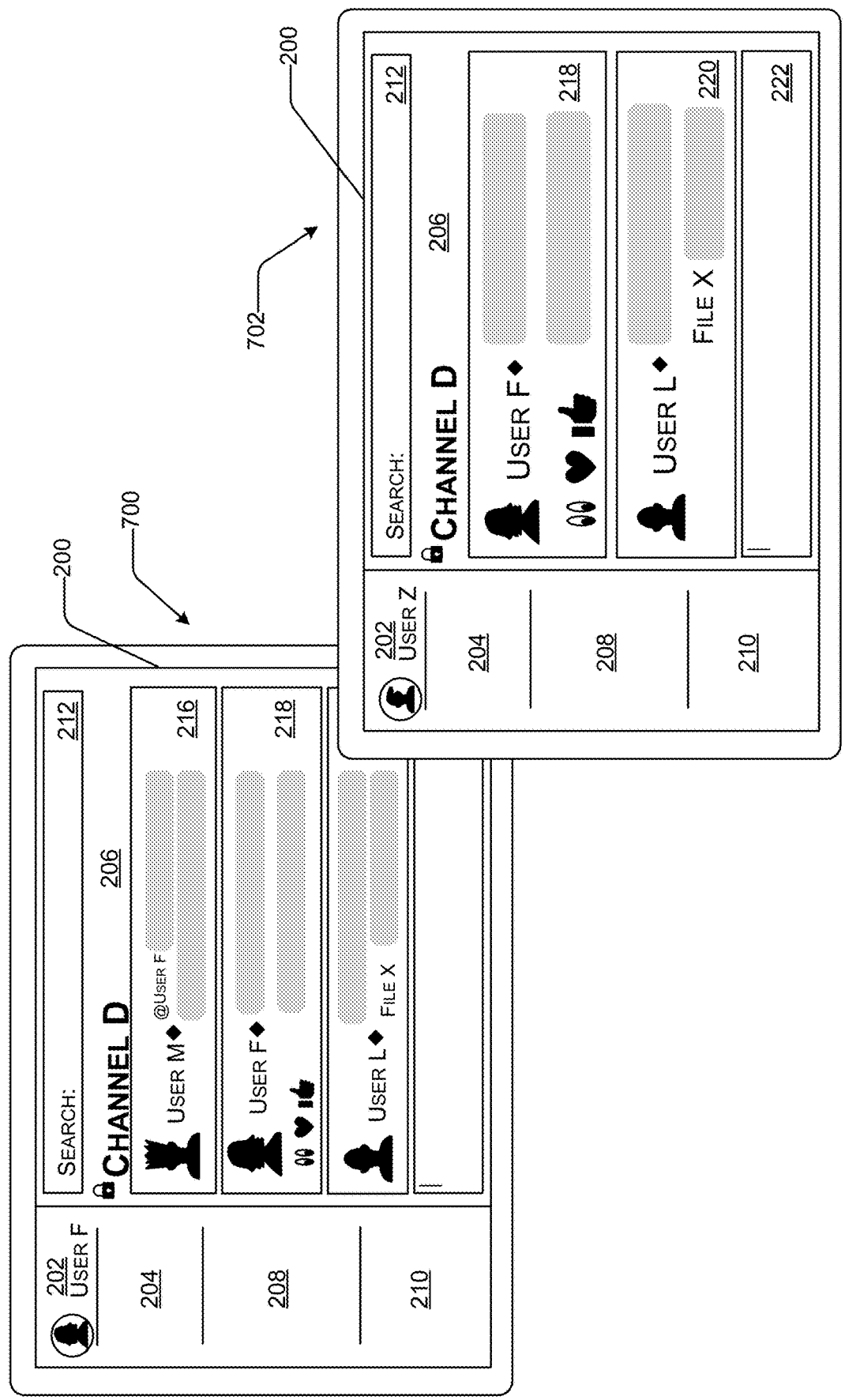
FIG. 7 illustrates an example of differentiated presentation of a user interface of a communication platform, as described herein, wherein features of individual messages are presented in accordance with different presentation characteristics based at least in part on different characteristics of two users.

In some examples, user data associated with a user profile/user profile can be used by the presentation management component 116 to determine presentation characteristics associated with the user interface 200 and/or messages associated therewith. In FIG. 7, a first instance 700 of the user interface 200 is presented in association with a first user profile and a second instance 702 of the user interface 200 is presented in association with a second user profile. In at least one example, the second user profile can indicate that the associated user is visually impaired or has a preference for larger font than the first user. As such, the presentation management component 116 can determine a presentation characteristic associated with message(s) presented via the second instance 602 of the user interface 200 which can cause the font and/or general layout to be larger and/or more spacious to enable the second user to easily consume content associated therewith.

FIGS. 1-7 make reference to "user interface elements." A user interface element can be any element of the user interface that is representative of an object, message, virtual space, and/or the like. A user interface element can be a text element, a graphical element, a picture, a logo, a symbol, and/or the like. In some examples, a user interface element can be presented as a pop-up, overlay, new sections of the user interface 200, a new user interface, part of another user interface element, and/or the like. In at least one example, individual of the user interface elements can be associated with actuation mechanisms. Such actuation mechanisms can make the corresponding user interface elements selectable or otherwise interactable. That is, actuation of an actuation mechanism as described herein can, in some examples, indicate a selection of a corresponding user interface element. In at least one example, the application 140 can receive an indication of an interaction with a user interface element (e.g., indication of a selection and/or actuation of an actuation mechanism) and can send an indication of such to the server(s) 102. In some examples, the server(s) 102 can send data and/or instructions to the application 140 to generate new user interfaces and/or update the user interface 200, as described herein.

The example user interfaces and user interface elements described above are provided for illustrative purposes. In some examples, such user interfaces and user interface elements can include additional or alternative data, which can be presented in additional or alternative configurations. That is, the user interfaces and user interface elements should not be construed as limiting.

FIGS. 8-11 are flowcharts showing example processes involving techniques as described herein. The processes illustrated in FIGS. 8-11 are described with reference to components of the environment 100 shown in FIG. 1 for convenience and ease of understanding. However, the processes illustrated in FIGS. 8-11 are not limited to being performed using the components described above with reference to the environment 100. Moreover, the components described above with reference to the environment 100 are not limited to performing the processes illustrated in FIGS. 8-11.

The processes in FIGS. 8-11 are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the processes in FIGS. 8-11 can be combined in whole or in part with each other or with other processes.

FIG. 8 illustrates an example process 800 for differentiating presentation of a message based at least in part on characteristic(s) of users of a communication platform, as described herein.

At operation 802, the presentation management component 116 can receive a message to be posted to a virtual space of a communication platform, wherein the virtual space is associated with a plurality of users. As described above, in at least one example, the presentation management component 116 can receive a message, which can be associated with one or more identifiers. In at least one example, the one or more identifiers can indicate a channel, direct message, or board with which the message is to be posted. That is, the one or more identifiers can indicate a virtual space to which the message is to be posted. In at least one example, each channel identifier, direct message identifier, board identifier, and/or the like can be mapped to or otherwise associated with one or more user identifiers indicating members of the channel, direct message, board, and/or the like. That is, in at least one example, a message can be associated with a recipient virtual space identifier (e.g., channel identifier, direct message identifier, board identifier, etc.) and recipient user identifier(s). In at least one example, the members of the virtual space can be associated with permissions indicating what content and/or data can be viewed, how such members can interact with the virtual space and/or content and/or data associated therewith, whether such members can add new members to the virtual space, and/or the like. Additional details associated with such permissions (i.e., permissions data 126) are described above with reference to FIG. 1.

At operation 804, the presentation management component 116 can determine, from a first user profile of a first user of the plurality of users, a first characteristic of the first user. In at least one example, the presentation management component 116 can utilize the recipient user identifier(s) to determine characteristic(s) of the recipient user(s). In at least one example, the presentation management component 116 can access user data associated with recipient user(s) using the recipient user identifier(s). The user data can be arranged in user profiles, as described below. In at least one example, user data associated with a user profile of a recipient user can be used to determine characteristic(s) of the recipient user. In at least one example, such characteristic(s) can comprise roles of the users, user types of the users, condition satisfaction, authentication, verification, group and/or team membership, user preferences of the users, and/or other user characteristics of the users.

In at least one example, the message can be associated with a recipient virtual space identifier which can be associated with a first user identifier of a first user that is associated with the recipient virtual space. In at least one example, the presentation management component 116 can utilize the first user identifier to access a first user profile of the first user. The first user identifier can be mapped to or otherwise be associated with the first user profile. In at least one example, the presentation management component 116 can determine a first characteristic associated with the first user based at least in part on user data associated with the first user profile.

At operation 806, the presentation management component 116 can determine, from a second user profile of a second user of the plurality of users, a second characteristic of the second user. In at least one example, the message can be associated with a recipient virtual space identifier which can be associated with a second user identifier of a second user that is associated with the recipient virtual space. In at least one example, the presentation management component 116 can utilize the second user identifier to access a second user profile of the second user. The second user identifier can be mapped to or otherwise be associated with the second user profile. In at least one example, the presentation management component 116 can determine a second characteristic associated with the second user based at least in part on user data associated with the second user profile.

At operation 808, the presentation management component 116 can differentiate presentation of the message in respective instances of a user interface of the communication platform based at least in part on the first characteristic and the second characteristic. In at least one example, the presentation management component 116 can utilize the recipient user identifier(s) to determine (i) characteristic(s) of the recipient user(s), as described above with respect to operations 804 and 806, and (ii) presentation characteristics for displaying the message to the recipient user(s). In at least one example, the presentation management component 116 can determine presentation characteristic(s) of the message based at least in part on characteristic(s) of the recipient user(s). In some examples, the message can be presented differently to individual of the recipient user(s) based at least in part on different characteristic(s) of the recipient user(s). In at least one example, the presentation management component 116 can send instruction(s) to a client of a recipient user to cause the message to be displayed in accordance with presentation characteristic(s) particular to the recipient user.

As described above, in some examples, "differentiated presentation" can refer to presenting messages and/or other aspects with different presentation characteristics. In some examples, presentation characteristics can refer to size, color, orientation, interactability, visibility, and/or the like. For example, as described with reference to the message 220, a presentation characteristic associated therewith can cause at least a portion of the message to be obfuscated so that a user who is not permitted to view the portion of the message cannot view the portion of the message. That is, a message, or a portion thereof, can be restricted for a particular user such that the user is not permitted to view at least a portion of the message. In such an example, the restricted portion of the message can be obfuscated such that the particular user is not able to view the corresponding contents of the message. In some examples, a message that is restricted for a particular user can be omitted from presentation via the user interface entirely. In some examples, inaccessible contents can be presented but with disabled mechanisms such that the contents are not accessible to a particular user who is not permitted to access them. In some examples, a presentation characteristic can cause a message to have a different size, orientation, contents, and/or the like. In some examples, a user or file associated with a message may be interactable in some examples and not interactable in other examples, based at least in part on presentation characteristics associated therewith. Examples of differentiated presentation of messages and/or user interfaces associated with the communication platform are provided above with reference to FIGS. 2-7.

Figure 9:
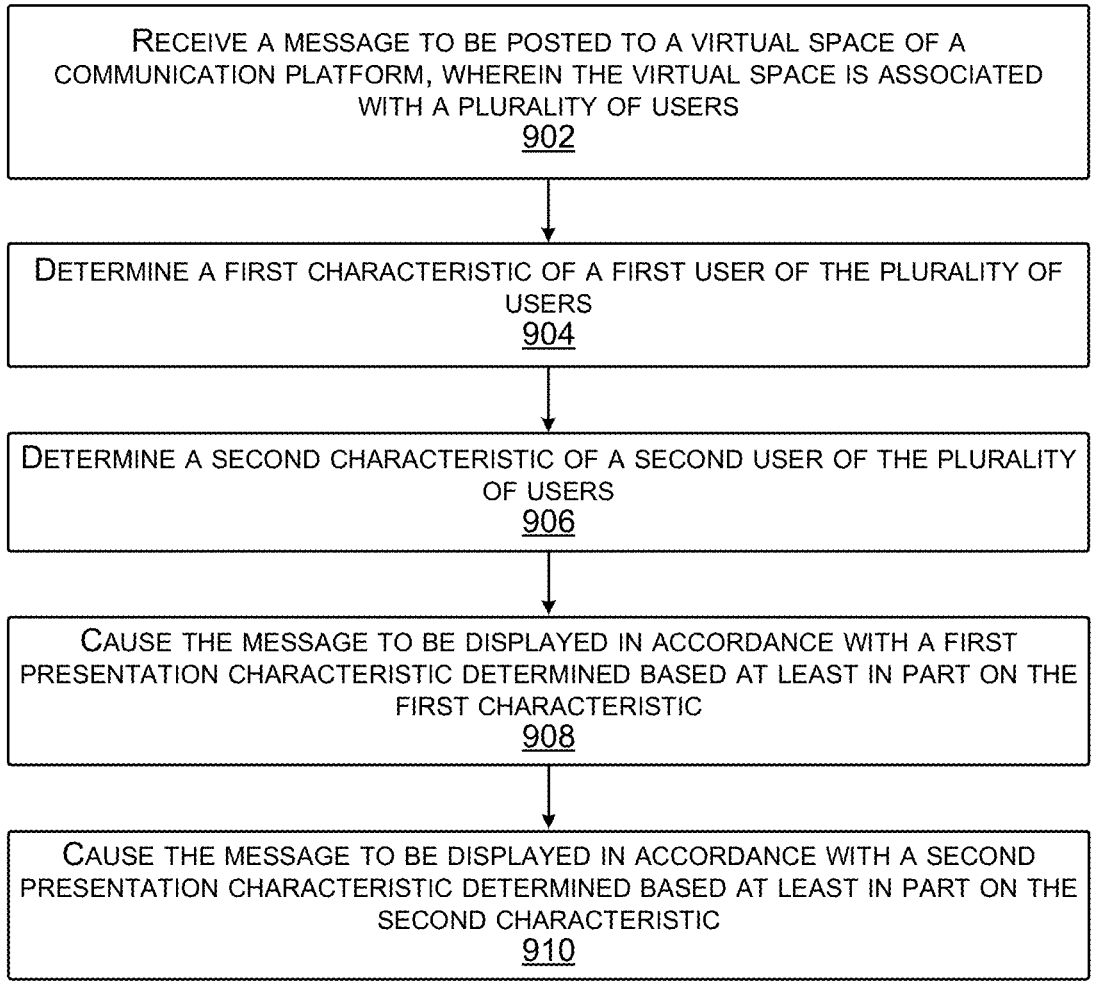
FIG. 9 illustrates another example process for differentiating presentation of a message based at least in part on characteristic(s) of users of a communication platform, as described herein.

FIG. 9 illustrates an example process 900 for differentiating presentation of a message based at least in part on characteristic(s) of users of a communication platform, as described herein.

At operation 902, the presentation management component 116 can receive a message to be posted to a virtual space of a communication platform, wherein the virtual space is associated with a plurality of users, as described above with reference to operation 802 of FIG. 8.

At operation 904, the presentation management component 116 can determine a first characteristic of the first user. In some examples, such a determination can be based at least in part on user data associated with a user profile of the first user, as described above with reference to operation 804 of FIG. 8. In some examples, such a determination can be based at least in part on other data such as an organizational chart indicating roles of users of the communication platform. In some examples, a determination of the first characteristic of the user can be based at least in part on organizational data, group data, channel data, direct message data, and/or the like.

At operation 906, the presentation management component 116 can determine a second characteristic of the second user. In some examples, such a determination can be based at least in part on user data associated with a user profile of the second user, as described above with reference to operation 806 of FIG. 8. In some examples, such a determination can be based at least in part on other data such as an organizational chart indicating roles of users of the communication platform. In some examples, a determination of the first characteristic of the user can be based at least in part on organizational data, group data, channel data, direct message data, and/or the like.

At operation 908, the presentation management component 116 can cause the message to be displayed in accordance with a first presentation characteristic based at least in part on the first characteristic of the first user. In some examples, the presentation management component 116 can determine presentation characteristics associated with a user interface of the communication platform, which can be based at least in part on the first characteristic of the first user. In at least one example, characteristics including, but not limited to, a role of the first user, a user type of the first user, a condition satisfaction, an authentication of the first user, a verification of the first user, group and/or team membership of the first user, a user preferences of the first user, and/or other user characteristic(s) of the first user can be used to determine presentation characteristic(s) for presenting the message to the first user. In some examples, such characteristic(s) can determine which functionality and/or control(s) are available via the user interface. In some examples, such characteristic(s) can determine which virtual spaces are represented via the user interface. In some examples, user interface elements presented via the user interface can be determined based at least in part on such characteristic(s).

At operation 910, the presentation management component 116 can cause the message to be displayed in accordance with a second presentation characteristic based at least in part on the second characteristic of the second user. In some examples, the presentation management component 116 can determine presentation characteristics associated with a user interface of the communication platform, which can be based at least in part on the second characteristic of the second user. In at least one example, characteristics including, but not limited to, a role of the second user, a user type of the second user, a condition satisfaction, an authentication of the second user, a verification of the second user, group and/or team membership of the second user, a user preferences of the second user, and/or other user characteristic(s) of the second user can be used to determine presentation characteristic(s) for presenting the message to the second user. In some examples, such characteristic(s) can determine which functionality and/or control(s) are available via the user interface. In some examples, such characteristic(s) can determine which virtual spaces are represented via the user interface. In some examples, user interface elements presented via the user interface can be determined based at least in part on such characteristic(s).

As described above, in some examples, the presentation management component 116 can utilize user characteristic(s) as described above to determine differentiated presentation characteristics for messages, user interfaces, and/or other aspects of the communication platform. In some examples, the presentation management component 116 can utilize additional or alternative context data. For example, the presentation management component 116 can utilize topics associated with messages, content of messages (e.g., whether messages are associated with files or references to other users), senders of messages, characteristics of such senders, dates, times, permissions, and/or the like to determine presentation characteristics for presenting messages via the communication platform. In some examples, the presentation management component 116 can utilize one or more rule(s) to determine presentation characteristics for presenting messages via the communication platform. In some examples, the presentation management component can utilize one or more machine-trained models to determine presentation characteristics for presenting messages via the communication platform.

Figure 10:
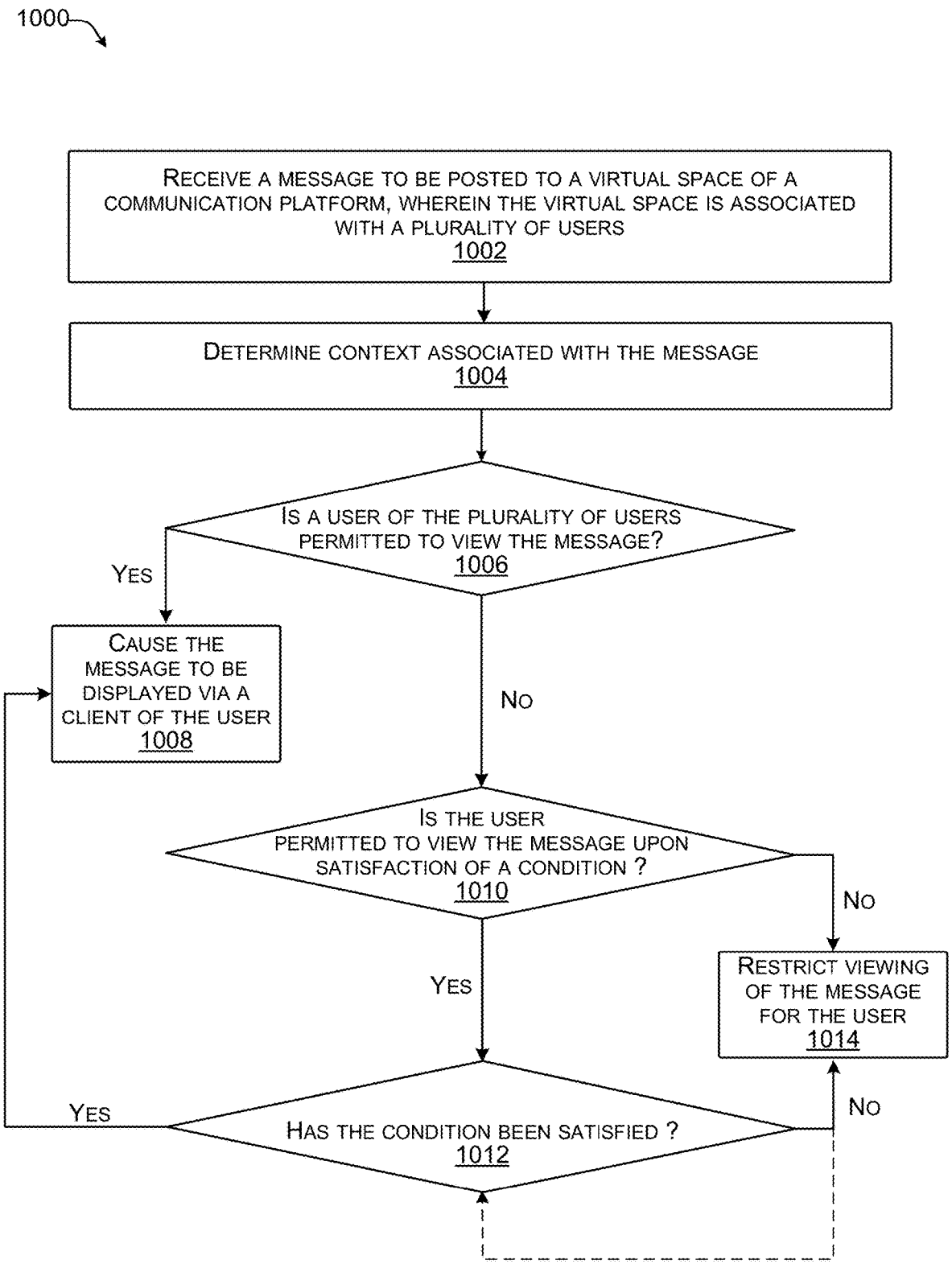
FIG. 10 illustrates an example process for determining whether to present a message based at least in part on a determination of whether a condition has been satisfied, as described herein.

FIG. 10 illustrates an example process 1000 for determining whether to present a message based at least in part on whether a condition has been satisfied, as described herein.

At operation 1002, the presentation management component 116 can receive a message to be posted to a virtual space of a communication platform, wherein the virtual space is associated with a plurality of users, as described above with reference to operation 802 of FIG. 8.

At operation 1004, the presentation management component 116 can determine context associated with the message. In at least one example, "context" associated with the message can include which virtual space(s) the message is to be posted, intended recipient(s), permissions associated therewith and/or user data associated therewith. In some examples, "context" can refer to topic(s) associated with the message, content of message (e.g., whether the message is associated with a file or reference to another user), a sender of the message, characteristic(s) of such a sender, date, time, permission(s), and/or the like.

At operation 1006, the presentation management component 116 can determine whether a user of the plurality of users is permitted to view the message. In at least one example, the presentation management component 116 can utilize the context associated with the message to determine whether the user is permitted to view the message. Based at least in part on determining that the user is permitted to view the message (i.e., "yes" at operation 1006), the presentation management component 116 can cause the message to be displayed via a client of the user, as illustrated at operation 1008. Based at least in part on determining that the user is not permitted to view the message (i.e., "no" at operation 1006), the presentation management component 116 can determine whether the user is permitted to view the message upon satisfaction of a condition at operation 1010. As described above, in some examples, a restriction can be based on a determination that the particular user has not satisfied a condition. Examples of conditions include signed documents (e.g., non-disclosure agreements, etc.), completed trainings, completed certifications, authentications, verifications, and/or the like. In some examples, a restricted message can be presented in association with a prompt or other instruction for the user to satisfy the condition. In some examples, the message can include a mechanism to enable the user to satisfy the condition, for example, by including a link to a document that needs to be signed, an embedding of a video or other content that needs to be watched, a link to a training program that needs to be completed, a log-in to facilitate authentication and/or verification, and/or the like. In some examples, the presentation management component 116 can receive an indication that the condition has been satisfied and can send an instruction to the client to cause the message to be presented without restriction.

In at least one example, based at least in part on determining that the user is permitted to view the message upon satisfaction of the condition (i.e., "yes" at operation 1010), the presentation management component 116 can determine whether the condition has been satisfied, as illustrated at operation 1012. In at least one example, based at least in part on the condition having been satisfied (i.e., "yes" at operation 1012), the presentation management component 116 can cause the message to be displayed via the client of the user at operation 1008, as described above.

In at least one example, if the user is not permitted to view the message upon satisfaction of the condition (i.e., "no" at operation 1010) and/or the condition has not been satisfied (i.e., "no" at operation 1012), the presentation management component 116 can restrict viewing of the message (or a portion thereof) for the user, as illustrated at operation 1014. In some examples, for instance if the user is permitted to view the message upon satisfaction of the condition but the condition has yet to be satisfied, the presentation management component 116 can return to operation 1012, as illustrated by the dashed line, to determine whether the condition has been satisfied and can repeat the process (e.g., operation 1012 and 1014) until the condition has been satisfied and the message is displayed via the client, as illustrated at operation 1008, or a period for satisfying the condition lapses.

Figure 11:
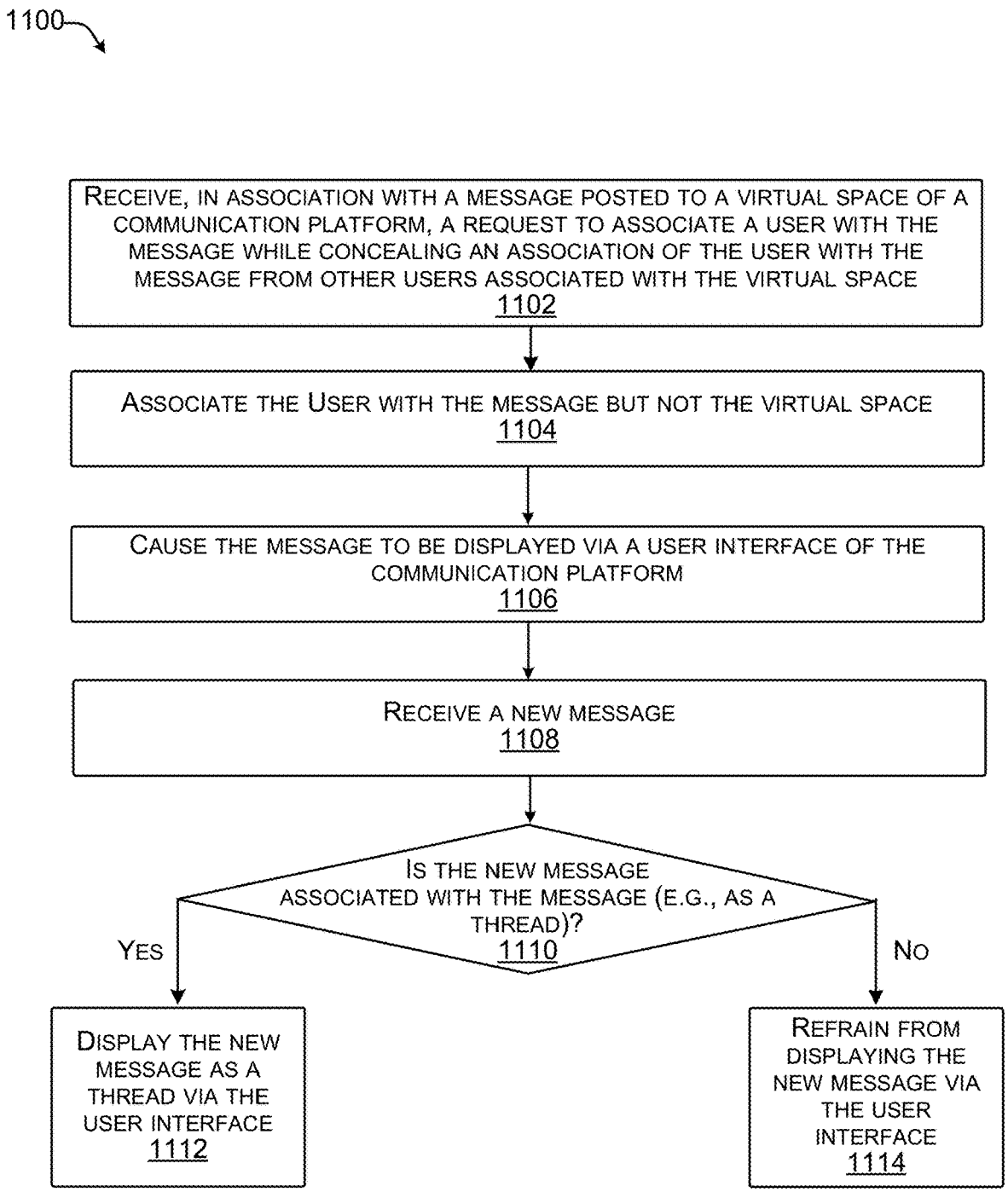
FIG. 11 illustrates an example process for adding a user to a message, but not a channel, as described herein.

FIG. 11 illustrates an example process 1100 for adding a user to a message, but not a channel, as described herein. As described above, in some examples, techniques described herein can relate to provisioning viewing privileges to a user (e.g., user profile) to enable the user to view a message and/or message thread without associating the user with a virtual space to which the message and/or message thread was posted. For example, a user can be associated with a message inconspicuously (e.g., similar to a blind carbon copy in email) such that other users are not aware of the association of the user with the message. In some examples, the user may not be associated with the virtual space to which the message is posted. In at least one example, association of the user with the message can enable the user to view the message and any subsequent messages associated with the message (e.g., message identifier). Such subsequent messages can be threaded messages. The user, however, may not be permitted to view other messages associated with the virtual space. Additional details are described below.

At operation 1102, the presentation management component 116 can receive, in association with a message posted to a virtual space of a communication platform, a request to associate a user with the message while concealing an association of the user with the message from other users associated with the virtual space. In at least one example, a user can provide an input via the user interface to associate another user with the message. In some examples, the user can tag the other user (e.g., via an @ mention or the like). In some examples, the user can identify the other user in association with a key word, phrase, image, symbol, emoji, and/or the like.

At operation 1104, the presentation management component 116 can associate the user with the message but not the virtual space. In at least one example, the presentation management component 116 can associate a user identifier of the other user with a message identifier of the message. As such, the user is permitted to view contents of the message and one or more other messages associated with the same message identifier (e.g., threaded messages). However, the presentation management component 116 can refrain from associating the user with the virtual space. That is, the presentation management component 116 may not associate the user identifier of the other user with the virtual space identifier. As such, the other user may not be permitted to view other contents of the virtual space. If the other user is already associated with the virtual space, the user may be permitted to view other contents of the virtual space.

At operation 1106, the presentation management component 116 can cause the message to be displayed via a user interface of the communication platform. In at least one example, based at least in part on the other user being associated with the message, the message can be presented via an instance of the user interface associated with a client of the other user.

At operation 1108, the presentation management component 116 can receive a new message. In at least one example, the presentation management component 116 can receive a new message associated with the virtual space.

At operation 1110, the presentation management component 116 can determine whether the new message is associated with the message and, based at least in part on determining the new message is associated with the message (i.e., "yes" at operation 1110) can cause the new message to be displayed as a thread via the user interface, as illustrated at operation 1112. In at least one example, the presentation management component 116 can determine whether the new message is associated with the same message identifier as the message received at operation 1102. If the message identifier is the same, the new message can be a thread to the original message and, based on the association of the user identifier of the other user with the message identifier, the new message can be presented via the instance of the user interface presented via the client of the other user. Based at least in part on determining that the new message is not associated with the message (i.e., "no" at operation 1110), the presentation management component 116 can refrain from displaying the new message via the user interface, as illustrated at operation 1114. That is, if the other user is not associated with the virtual space, the other user may not be permitted to view incoming messages or previous messages. However, as noted above, if the user is associated with the virtual space the user may be permitted to view such messages via their respective instance of the user interface.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

EXAMPLE CLAUSES

A. A method comprising: receiving a message to be posted to a group-based communication system, wherein a plurality of users are permissioned to access content associated with the group-based communication system; determining, based at least in part on a first characteristic associated with a first user profile of a first user of the plurality of users, a first presentation characteristic of the message; determining, based at least in part on a second characteristic associated with a second user profile of a second user of the plurality of users, a second presentation characteristic of the message that is different from the first presentation characteristic; causing the message to be displayed in accordance with the first presentation characteristic via a first instance of a user interface presented via a first client of the first user; and causing the message to be displayed in accordance with the second presentation characteristic via a second instance of the user interface via a second client of the second user.

B. The method of paragraph A, wherein the message is to be posted to at least one of a channel, a direct message, or a board associated with the group-based communication system.

C. The method of paragraph A or B, wherein the first characteristic corresponds to a first organization of two or more different organizations and the second characteristic corresponds to a second organization of the two or more different organizations.

D. The method of any of paragraphs A-C, further comprising determining the first characteristic and the second characteristic is further based at least in part on an organizational chart with which the first user and the second user are associated.

E. The method of any of paragraphs A-D, wherein the first characteristic corresponds to a first role and the second characteristic corresponds to a second role different from the first role.

F. The method of any of paragraphs A-E, further comprising determining the first characteristic and the second characteristic is further based at least in part on data associated with previous interactions between at least one of the first user or the second user and the group-based communication system.

G. The method of any of paragraphs A-F, wherein, based at least in part on the first presentation characteristic, content of the message is visible to the first user and, based at least in part on the second presentation characteristic, at least a portion of the content of the message is not visible to the second user.

H. The method of any of paragraphs A-G, wherein the message, when presented via the second instance of the user interface, is presented with a prompt to perform a task.

I. A system comprising: one or more processors; and one or more non-transitory computer-readable media storing instructions that, when executed by the one or more processors, cause the system to perform operations comprising: receiving a message to be posted to a group-based communication system, wherein a plurality of users are permissioned to access content associated with the group-based communication system; determining, based at least in part on a first characteristic associated with a first user profile of a first user of the plurality of users, a first presentation characteristic of the message; determining, based at least in part on a second characteristic associated with a second user profile of a second user of the plurality of users, a second presentation characteristic of the message that is different from the first presentation characteristic; causing the message to be displayed in accordance with the first presentation characteristic via a first instance of a user interface presented via a first client of the first user; and causing the message to be displayed in accordance with the second presentation characteristic via a second instance of the user interface via a second client of the second user.

J. The system of paragraph I, wherein the first characteristic corresponds to a first organization of two or more different organizations and the second characteristic corresponds to a second organization of the two or more different organizations.

K. The system of paragraph I or J, the operations further comprising determining the first characteristic and the second characteristic is further based at least in part on an organizational chart with which the first user and the second user are associated, and wherein the first characteristic corresponds to a first role and the second characteristic corresponds to a second role different from the first role.

L. The system of any of paragraphs I-K, the operations further comprising determining the first characteristic and the second characteristic is further based at least in part on data associated with previous interactions of at least one of the first user and the second user with the group-based communication system, and wherein the first characteristic corresponds to a first role and the second characteristic corresponds to a second role different from the first role.

M. The system of any of paragraphs I-L, wherein, based at least in part on the first presentation characteristic, content of the message is visible to the first user and, based at least in part on the second presentation characteristic, at least a portion of the content of the message is not visible to the second user.

N. The system of any of paragraphs I-M, wherein the message, when presented via the second instance of the user interface, is presented with a prompt to perform a task.

O. One or more non-transitory computer-readable media storing instructions that, when executed by one or more processors, cause the one or more processors to perform operations comprising: receiving a message to be posted to a group-based communication system, wherein a plurality of users are permissioned to access content associated with the group-based communication system; determining, based at least in part on a first characteristic associated with a first user profile of a first user of the plurality of users, a first presentation characteristic of the message; determining, based at least in part on a second characteristic associated with a second user profile of a second user of the plurality of users, a second presentation characteristic of the message that is different from the first presentation characteristic; causing the message to be displayed in accordance with the first presentation characteristic via a first instance of a user interface presented via a first client of the first user; and causing the message to be displayed in accordance with the second presentation characteristic via a second instance of the user interface via a second client of the second user.

P. The one or more non-transitory computer-readable media of paragraph O, wherein the first characteristic corresponds to a first organization of two or more different organizations and the second characteristic corresponds to a second organization of the two or more different organizations.

Q. The one or more non-transitory computer-readable media of paragraph O or P, the operations further comprising determining the first characteristic and the second characteristic further based at least in part on an organizational chart with which the first user and the second user are associated, and wherein the first characteristic corresponds to a first role and the second characteristic corresponds to a second role different from the first role.

R. The one or more non-transitory computer-readable media of any of paragraphs O-Q, the operations further comprising determining the first characteristic and the second characteristic further based at least in part on data associated with previous interactions of at least one of the first user and the second user with the group-based communication system, and wherein the first characteristic corresponds to a first role and the second characteristic corresponds to a second role different from the first role.

S. The one or more non-transitory computer-readable media of any of paragraphs O-R, wherein, based at least in part on the first presentation characteristic, content of the message is visible to the first user and, based at least in part on the second presentation characteristic, at least a portion of the content of the message is not visible to the second user.

T. The one or more non-transitory computer-readable media of any of paragraphs O-S, wherein the message, when presented via the second instance of the user interface, is presented with a prompt to perform a task.

While the example clauses described above are described with respect to one particular implementation, it should be understood that, in the context of this document, the content of the example clauses can also be implemented via a method, device, system, a computer-readable medium, and/or another implementation. Additionally, any of examples A-T may be implemented alone or in combination with any other one or more of the examples A-T.

What is claimed is:

1. A method comprising:
   receiving a message to be posted to a group-based communication system, wherein a plurality of users are permissioned to access content associated with the group-based communication system;
   generating, based at least in part on the message and interaction data and by the group-based communication system, a first characteristic associated with a first user profile of a first user of the plurality of users, wherein the first characteristic is associated with a first organizational identifier associated with a first organization;
   generating, based at least in part on the message and the interaction data and by the group-based communication system, a second characteristic associated with a second user profile of a second user of the plurality of users, wherein the second characteristic is associated with a second organizational identifier associated with a second organization that is different from the first organization;
   determining that the second organization is external to the first organization;
   determining, based at least in part on the second organization being external to the first organization and by the group-based communication system, a first presentation characteristic of the message associated with the first characteristic and a second presentation characteristic of the message associated with the second characteristic;
   causing the message to be displayed in accordance with the first presentation characteristic via a first instance of a user interface presented via a first client of the first user; and
   causing the message to be displayed in accordance with the second presentation characteristic via a second instance of the user interface via a second client of the second user.

2. The method of claim 1, wherein the message is to be posted to at least one of a channel, a direct message, or a board associated with the group-based communication system.

3. The method of claim 1, wherein the first characteristic and the second characteristic are determined based at least in part on an organizational chart with which the first user and the second user are associated.

4. The method of claim 1, wherein the first characteristic corresponds to a first role and the second characteristic corresponds to a second role different from the first role.

5. The method of claim 1, wherein the interaction data comprises data associated with previous interactions between at least one of the first user or the second user and the group-based communication system.

6. The method of claim 1, wherein, based at least in part on the first presentation characteristic, content of the message is visible to the first user and, based at least in part on the second presentation characteristic, at least a portion of the content of the message is not visible to the second user.

7. The method of claim 1, wherein the message, when presented via the second instance of the user interface, is presented with a prompt to perform a task.

8. The method of claim 1, wherein the first organization is associated with a first permission and the second organization is associated with a second permission that is different from the first permission.

9. The method of claim 1, wherein the second presentation characteristic indicates that at least a portion of the message is to be obfuscated with respect to the second user.

10. A system comprising:
    one or more processors; and
    one or more non-transitory computer-readable media storing instructions that, when executed by the one or more processors, cause the system to perform operations comprising:
    receiving a message to be posted to a group-based communication system, wherein a plurality of users are permissioned to access content associated with the group-based communication system;
    generating, based at least in part on the message and interaction data and by the group-based communication system, a first characteristic associated with a first user profile of a first user of the plurality of users, wherein the first characteristic is associated with a first organizational identifier associated with a first organization;
    generating, based at least in part on the message and the interaction data and by the group-based communication system, a second characteristic associated with a second user profile of a second user of the plurality of users, wherein the second characteristic is associated with a second organizational identifier associated with a second organization that is different from the first organization;

determining that the second organization is external to the first organization;

determining, based at least in part on the second organization being external to the first organization and by the group-based communication system, a first presentation characteristic of the message associated with the first characteristic and a second presentation characteristic of the message associated with the second characteristic;

causing the message to be displayed in accordance with the first presentation characteristic via a first instance of a user interface presented via a first client of the first user; and causing the message to be displayed in accordance with the second presentation characteristic via a second instance of the user interface via a second client of the second user.

11. The system of claim 10, wherein the first characteristic and the second characteristic are determined based at least in part on an organizational chart with which the first user and the second user are associated, and wherein the first characteristic corresponds to a first role and the second characteristic corresponds to a second role different from the first role.

12. The system of claim 10, wherein the interaction data comprises data associated with previous interactions of at least one of the first user and the second user with the group-based communication system, and wherein the first characteristic corresponds to a first role and the second characteristic corresponds to a second role different from the first role.

13. The system of claim 10, wherein, based at least in part on the first presentation characteristic, content of the message is visible to the first user and, based at least in part on the second presentation characteristic, at least a portion of the content of the message is not visible to the second user.

14. The system of claim 10, wherein the message, when presented via the second instance of the user interface, is presented with a prompt to perform a task.

15. The system of claim 10, wherein the first organization is associated with a first permission and the second organization is associated with a second permission that is different from the first permission.

16. One or more non-transitory computer-readable media storing instructions that, when executed by one or more processors, cause the one or more processors to perform operations comprising:

receiving a message to be posted to a group-based communication system, wherein a plurality of users are permissioned to access content associated with the group-based communication system;

generating, based at least in part on the message and interaction data and by the group-based communication system, a first characteristic associated with a first user profile of a first user of the plurality of users, wherein the first characteristic is associated with a first organizational identifier associated with a first organization;

generating, based at least in part on the message and the interaction data and by the group-based communication system, a second characteristic associated with a second user profile of a second user of the plurality of users, wherein the second characteristic is associated with a second organizational identifier associated with a second organization that is different from the first organization;

determining that the second organization is external to the first organization;

determining, based at least in part on the second organization being external to the first organization and by the group-based communication system, a first presentation characteristic of the message associated with the first characteristic and a second presentation characteristic of the message associated with the second characteristic;

causing the message to be displayed in accordance with the first presentation characteristic via a first instance of a user interface presented via a first client of the first user; and causing the message to be displayed in accordance with the second presentation characteristic via a second instance of the user interface via a second client of the second user.

17. The one or more non-transitory computer-readable media of claim 16, wherein the first characteristic and the second characteristic are determined based at least in part on an organizational chart with which the first user and the second user are associated, and wherein the first characteristic corresponds to a first role and the second characteristic corresponds to a second role different from the first role.

18. The one or more non-transitory computer-readable media of claim 16, wherein the interaction data comprises data associated with previous interactions of at least one of the first user and the second user with the group-based communication system, and wherein the first characteristic corresponds to a first role and the second characteristic corresponds to a second role different from the first role.

19. The one or more non-transitory computer-readable media of claim 16, wherein, based at least in part on the first presentation characteristic, content of the message is visible to the first user and, based at least in part on the second presentation characteristic, at least a portion of the content of the message is not visible to the second user.

20. The one or more non-transitory computer-readable media of claim 16, wherein the first organization is associated with a first permission and the second organization is associated with a second permission that is different from the first permission.

* * * * *